US012764818B2

(12) United States Patent
Habu et al.

(10) Patent No.: US 12,764,818 B2
(45) Date of Patent: Oct. 13, 2026

(54) COMMUNICATION APPARATUS AND COMMUNICATION METHOD

(71) Applicant: SONY GROUP CORPORATION, Tokyo (JP)

(72) Inventors: Yuki Habu, Tokyo (JP); Jungo Goto, Tokyo (JP); Koki Horita, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 382 days.

(21) Appl. No.: 18/548,483

(22) PCT Filed: Mar. 11, 2021

(86) PCT No.: PCT/JP2021/009815
§ 371 (c)(1),
(2) Date: Aug. 30, 2023

(87) PCT Pub. No.: WO2022/190313
PCT Pub. Date: Sep. 15, 2022

(65) Prior Publication Data

US 2024/0138009 A1 Apr. 25, 2024
US 2024/0237105 A9 Jul. 11, 2024

(51) Int. Cl.
*H04W 76/15* (2018.01)
*H04W 36/14* (2009.01)

(52) U.S. Cl.
CPC ........... *H04W 76/15* (2018.02); *H04W 36/14* (2013.01)

(58) Field of Classification Search
None
See application file for complete search history.

(56) References Cited

U.S. PATENT DOCUMENTS

2009/0016278 A1* 1/2009 Wakabayashi ........ H04W 72/21 370/329
2014/0247759 A1 9/2014 Zhang
(Continued)

FOREIGN PATENT DOCUMENTS

JP 2000-151832 A 5/2000
JP 2014504830 A 2/2014
(Continued)

OTHER PUBLICATIONS

International Search Report and Written Opinion of PCT Application No. PCT/JP2021/009815, issued on Jun. 1, 2021, 08 pages of ISRWO.

*Primary Examiner* — Rebecca E Song
(74) *Attorney, Agent, or Firm* — CHIP LAW GROUP

(57) ABSTRACT

A communication apparatus includes a first communication unit, a second communication unit, and a control unit. The first communication unit performs wireless communication via an upper communication path. The second communication unit communicates with a terminal apparatus via a selected communication path that is one of a plurality of lower communication paths including a wireless communication path and a wired communication path. The control unit detects whether or not communication using the selected communication path has an effect on the upper communication path, and, when the effect is detected, estimates, for each combination of the plurality of lower communication paths and the upper communication path, a communication state of the upper communication path and the lower communication path included in the combination.

13 Claims, 21 Drawing Sheets

(56) References Cited

U.S. PATENT DOCUMENTS

| | | | | |
|---|---|---|---|---|
| 2016/0007394 | A1* | 1/2016 | Hassan | H04W 28/18 455/450 |
| 2017/0317866 | A1* | 11/2017 | Stirling-Gallacher | H04B 7/088 |
| 2018/0287739 | A1* | 10/2018 | Kim | H04J 11/0023 |
| 2020/0112331 | A1* | 4/2020 | Shimura | H04B 1/401 |
| 2021/0045130 | A1 | 2/2021 | Tang | |
| 2021/0050983 | A1* | 2/2021 | Manolakos | H04W 24/10 |
| 2021/0378039 | A1* | 12/2021 | Cherian | H04W 74/0816 |

FOREIGN PATENT DOCUMENTS

| | | | |
|---|---|---|---|
| JP | 2014505422 | A | 2/2014 |
| JP | 2014527380 | A | 10/2014 |
| JP | 2015-015680 | A | 1/2015 |
| JP | 2015521425 | A | 7/2015 |
| JP | 2019-102917 | A | 6/2019 |
| WO | 2017/130593 | A1 | 8/2017 |
| WO | WO-2020080044 | A1 | 4/2020 |

* cited by examiner

| UPPER COMMUNICATION PATH=Ethernet | | THROUGHPUT DETERIORATION DEGREE (WHEN COMPARED WITH TIME OF NON-TETHERING) |
|---|---|---|
| LOWER COMMUNICATION PATH | Eth | N/A |
| | USB | N/A |
| | BT | 0% |
| | WLAN | 0% |

FIG.7

| UPPER COMMUNICATION PATH=BT | | THROUGHPUT DETERIORATION DEGREE (WHEN COMPARED WITH TIME OF NON-TETHERING) |
|---|---|---|
| LOWER COMMUNICATION PATH | Eth | 0% |
| | USB | 0% |
| | BT | 0% |
| | WLAN | 0% |

FIG.8

| UPPER COMMUNICATION PATH=WLAN | | THROUGHPUT DETERIORATION DEGREE (WHEN COMPARED WITH TIME OF NON-TETHERING) |
|---|---|---|
| LOWER COMMUNICATION PATH | Eth | 0% |
| | USB | 0% |
| | BT | -20% |
| | WLAN | -20% |

FIG.9

| UPPER COMMUNICATION PATH=Cellular | | THROUGHPUT DETERIORATION DEGREE (WHEN COMPARED WITH TIME OF NON-TETHERING) |
|---|---|---|
| LOWER COMMUNICATION PATH | Eth | -30% |
| | USB | -30% |
| | BT | 0% |
| | WLAN | 0% |

FIG.10

| Uplink THROUGHPUT (Mbps) | | UPPER COMMUNICATION PATH | | | | |
|---|---|---|---|---|---|---|
| | | Eth | WLAN | Cellular | | |
| | | | | MILLIMETER WAVE Main Ant#1 | MILLIMETER WAVE Main Ant#2 | Other (AVERAGE) |
| LOWER COMMUNICATION PATH | ABSENT | 1000 | 300 | 800 | 800 | 180 |
| | Eth | N/A | 300 | 800 | 600 | 180 |
| | USB | N/A | 300 | 800 | 600 | 180 |
| | WLAN | 1000 | 300 | 800 | 800 | 180 |

FIG.18

| THROUGHPUT DETERIORATION | | UPPER COMMUNICATION PATH |
| --- | --- | --- |
| | | Any |
| POWER SAVING SETTING | OFF (Default) | 0% |
| | ON | -5% |

FIG.19

| THROUGHPUT DETERIORATION | | UPPER COMMUNICATION PATH |
| --- | --- | --- |
| | | Any |
| VPN CONNECTION | ABSENT (Default) | 0% |
| | PRESENT | -10% |

FIG.20

| THROUGHPUT DETERIORATION DEGREE IN CASE WHERE UPPER COMMUNICATION PATH=Wi-Fi (COMPARED WITH NON-TETHERING) | | LOCATION | |
|---|---|---|---|
| | | HOME | OFFICE |
| LOWER COMMUNICA-TION PATH | WIRED | 0% | 0% |
| | Wi-Fi | -10% | -30% |

FIG.21

| THROUGHPUT DETERIORATION DEGREE IN CASE WHERE UPPER COMMUNICATION PATH= Cellular MILLIMETER WAVE (COMPARED WITH NON-TETHERING) | | LOCATION | |
|---|---|---|---|
| | | HOME | OFFICE |
| LOWER COMMUNICA-TION PATH | WIRED | -10% | 0% |
| | Wi-Fi | 0% | -20% |

FIG.26

| ESTIMATED THROUGHPUT OF SLAVE DEVICE(Mbps) | | UPPER COMMUNICATION PATH | |
|---|---|---|---|
| | | WLAN | Cellular |
| LOWER COMMUNICATION PATH | Eth | 300 | 80 |
| | USB | 300 | 80 |
| | BT | 2 | 2 |
| | WLAN | 250 | 90 |

FIG.27

RECEPTION INFORMATION FROM SLAVE DEVICE(EXAMPLE):

{
"require-type" : "latency",
"require-value" : null,
"client capabilities": ["Ethernet", "Wi-Fi"]
}

FIG.28

| UPPER COMMUNICATION PATH=Any | | DELAY DETERIORATION DEGREE (WHEN COMPARED WITH TIME OF NON-TETHERING) |
|---|---|---|
| LOWER COMMUNICATION PATH | Eth | -5% |
| | USB | -5% |
| | WLAN | -20% |

FIG.29

| movie Live Upload RESOLUTION(H.264 60fps) | | UPPER COMMUNICATION PATH | |
|---|---|---|---|
| | | WLAN | Cellular |
| LOWER COMMUNICATION PATH | Eth | 2160p(4K) | 2160p(4K) |
| | USB | 2160p(4K) | 2160p(4K) |
| | BT | 480p | 480p |
| | WLAN | 2160p(4K) | 2160p(4K) |

COMMUNICATION APPARATUS AND COMMUNICATION METHOD

CROSS REFERENCE TO RELATED APPLICATIONS

This application is a U.S. National Phase of International Patent Application No. PCT/JP2021/009815 filed on Mar. 11, 2021. Each of the above-referenced applications is hereby incorporated herein by reference in its entirety.

FIELD

The present disclosure relates to a communication apparatus and a communication method.

BACKGROUND

A technology for connecting a terminal apparatus (slave device) to an upstream network using a communication function of a communication apparatus (master device) is known. As an example of such a technology, a technology called tethering is known in which a terminal apparatus such as a camera or a tablet is connected to an upstream network using a communication function of a communication apparatus such as a smartphone.

The communication apparatus that performs tethering establishes a plurality of communication paths including a communication path for connection to an upstream network and a communication path for connection to the terminal apparatus. A technology for selecting an optimum communication path in an apparatus that establishes a plurality of communication paths as described above is known.

CITATION LIST

Patent Literature

Patent Literature 1: WO 2017/130593 A

SUMMARY

Technical Problem

In order to achieve stable communication quality in a communication path (downstream network) between a communication apparatus and a terminal apparatus, for example, a wired (cable) communication path using universal serial bus (USB) or Ethernet (registered trademark) is often selected.

Here, for example, in New Radio (NR) which is a wireless access method of cellular mobile communication, utilization of a high frequency band called a millimeter wave from 52.6 GHz to 110 GHz has been studied.

The millimeter wave has a large propagation loss and high straightness as compared with the 2 GHz band currently used in cellular. Therefore, when the communication apparatus and the terminal apparatus are connected by a cable, there is a possibility that the millimeter wave is shielded by the cable. As described above, when the communication path of the upstream network using the millimeter wave is shielded by the cable connecting the communication apparatus and the terminal apparatus, there is a possibility that the communication quality of the upstream network is deteriorated.

Even when the communication quality of the downstream network is stable by wired connection, when the communication quality of the upstream network deteriorates, the communication quality of the terminal apparatus connected to the upstream network via the downstream network deteriorates.

As described above, a relationship (dependence relationship) in which upstream/downstream networks affect each other may occur. In such tethering, even in a case where the dependence relationship occurs in the upstream/downstream networks, it is desirable to perform tethering with more optimal communication quality.

Thus, the present disclosure provides a mechanism capable of performing tethering with more optimal communication quality even in a case where the dependence relationship occurs in upstream/downstream networks.

Note that the above problem or object is merely one of a plurality of problems or objects that can be solved or achieved by a plurality of embodiments disclosed in the present specification.

Solution to Problem

According to the present disclosure, a communication apparatus is provided. The communication apparatus includes a first communication unit, a second communication unit, and a control unit. The first communication unit performs wireless communication via an upper communication path. The second communication unit communicates with a terminal apparatus via a selected communication path that is one of a plurality of lower communication paths including a wireless communication path and a wired communication path. The control unit detects whether or not communication using the selected communication path has an effect on the upper communication path, and, when the effect is detected, estimates, for each combination of the plurality of lower communication paths and the upper communication path, a communication state of the upper communication path and the lower communication path included in the combination.

BRIEF DESCRIPTION OF DRAWINGS

FIG. 7 is a table describing an example of dependence information according to an embodiment of the present disclosure.

FIG. 8 is a table describing an example of dependence information according to an embodiment of the present disclosure.

FIG. 9 is a table describing an example of dependence information according to an embodiment of the present disclosure.

FIG. 10 is a table illustrating another example of dependence information according to an embodiment of the present disclosure.

FIG. 18 is a table for describing an example of dependence information according to the first modification of the embodiment of the present disclosure.

FIG. 19 is a table for describing another example of dependence information according to the first modification of the embodiment of the present disclosure.

FIG. 20 is a table for describing another example of dependence information according to the first modification of the embodiment of the present disclosure.

FIG. 21 is a table for describing another example of dependence information according to the first modification of the embodiment of the present disclosure.

FIG. 26 is a table illustrating an example of dependence information according to the second modification of the embodiment of the present disclosure.

FIG. 27 is a diagram illustrating another example of capability information according to the second modification of the embodiment of the present disclosure.

FIG. 28 is a table illustrating another example of dependence information according to the second modification of the embodiment of the present disclosure.

FIG. 29 is a table illustrating another example of dependence information according to the second modification of the embodiment of the present disclosure.

DESCRIPTION OF EMBODIMENTS

An embodiment of the present disclosure will be described in detail below with reference to the accompanying drawings. Note that redundant descriptions will be omitted from the present specification and the drawings by assigning the same reference signs to components having substantially the same functional configuration.

Further, similar components of embodiments may be distinguished by assigning the same reference signs followed by different alphabets or numbers in the present specification and the drawings. However, when it is unnecessary to particularly distinguish each of the similar components, only the same reference sign is assigned.

One or a plurality of embodiments (including examples and modifications) described below can each be implemented independently. On the other hand, at least some of the plurality of embodiments described below may be implemented by being appropriately combined with at least some of other embodiments. The plurality of embodiments may include novel features different from each other. Accordingly, the plurality of embodiments can contribute to solving different objects or problems, and can exhibit different effects.

1. INTRODUCTION

1.1. Example of Communication System

Figure 1:
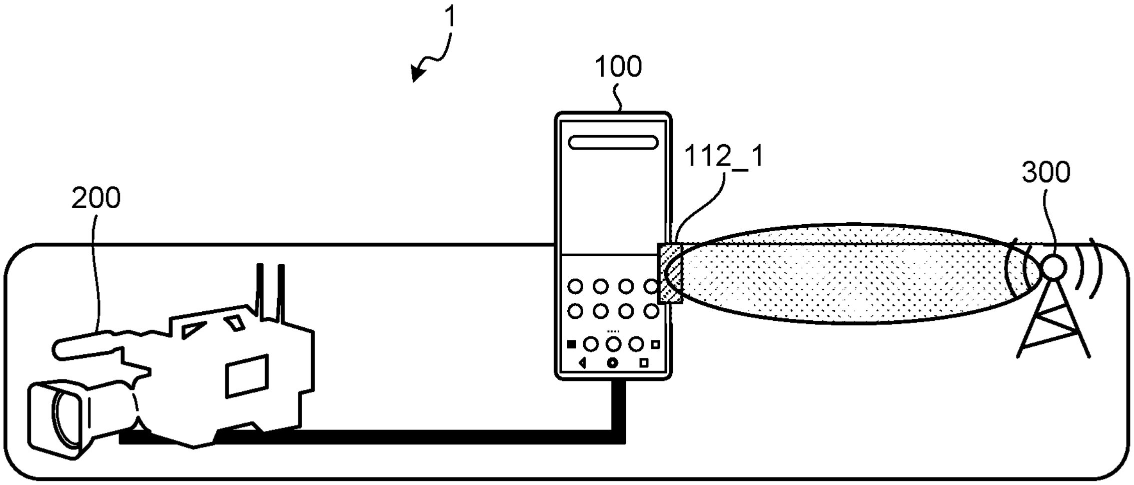
FIG. 1 is a diagram illustrating a configuration example of a communication system according to a proposed technology of the present disclosure.

First, an outline of a communication system 1 according to a proposed technology of the present disclosure will be described. FIG. 1 is a diagram illustrating a configuration example of the communication system 1 according to the proposed technology of the present disclosure.

The communication system 1 illustrated in FIG. 1 includes a communication apparatus 100 and a terminal apparatus 200. The terminal apparatus 200 is connected to an upstream network (hereinafter, also referred to as upper network (NW)) by using a communication function of the communication apparatus 100. As described above, the communication system 1 has a tethering function.

The communication apparatus 100 is connected to the upper NW by wireless communication via an upper communication path such as a smartphone or a mobile terminal. In the example of FIG. 1, the communication apparatus 100 is connected to the upper NW by communicating with a base station 300 via an antenna 112_1. In this case, the upper NW is, for example, a cellular network. Alternatively, the communication apparatus 100 is connected to the upper NW by communicating with an access point (illustration omitted). In this case, the upper NW is, for example, Wi-Fi (registered trademark).

In this manner, the communication apparatus 100 is connected to the upper NW by wireless communication via one of a plurality of upper communication paths.

Further, the communication apparatus 100 communicates with the terminal apparatus 200 via one of a plurality of lower communication paths including a wireless communication path or a wired communication path. The network between the communication apparatus 100 and the terminal apparatus 200 is also referred to as a downstream network or a lower NW.

In the example of FIG. 1, the communication apparatus 100 is connected to the terminal apparatus 200 by a USB cable, and communicates with the terminal apparatus 200 on the basis of, for example, the USB3.x standard. The lower NW is not limited to the USB, and may be, for example, a wired network such as Ethernet (registered trademark) or a wireless network such as Bluetooth (registered trademark) or Wi-Fi (registered trademark).

Note that, in order to further stabilize the communication quality between the communication apparatus 100 and the terminal apparatus 200, it is desirable to use wired connection for connection between the communication apparatus 100 and the terminal apparatus 200.

The terminal apparatus 200 is, for example, a camera, a tablet, or the like, and is connected to the upper NW via the communication apparatus 100.

Note that, hereinafter, the communication apparatus 100 is also referred to as a master device 100. Further, the terminal apparatus 200 is also referred to as a slave device 200.

1.2. Problem

As described above, when the master device 100 such as a smartphone performs tethering, there is a plurality of paths (lower communication paths) such as Bluetooth (registered trademark), Wi-Fi (registered trademark), USB, and Ethernet (registered trademark) as the lower NW.

With development of various communication standards, quality and speed of each communication are also improved. Therefore, the communication quality that the slave device 200 enjoys as the lower NW is also improved. For example, the quality and speed of communication are improved by shifting USB from USB3.0 to USB3.1 and Wi-Fi (registered trademark) from 802.11ac to 802.11ax.

However, in a case where it is desired to stabilize the communication quality of the lower NW, in general, connection by a cable such as USB or Ethernet (registered trademark) is likely to be selected as the lower NW.

Here, when the wireless access method of cellular mobile communication is shifted from 4G to 5G, the master device 100 can perform communication using a millimeter wave for communication of the upper NW. The millimeter wave has strong straightness and a large propagation loss due to a shielding object.

Figure 2:
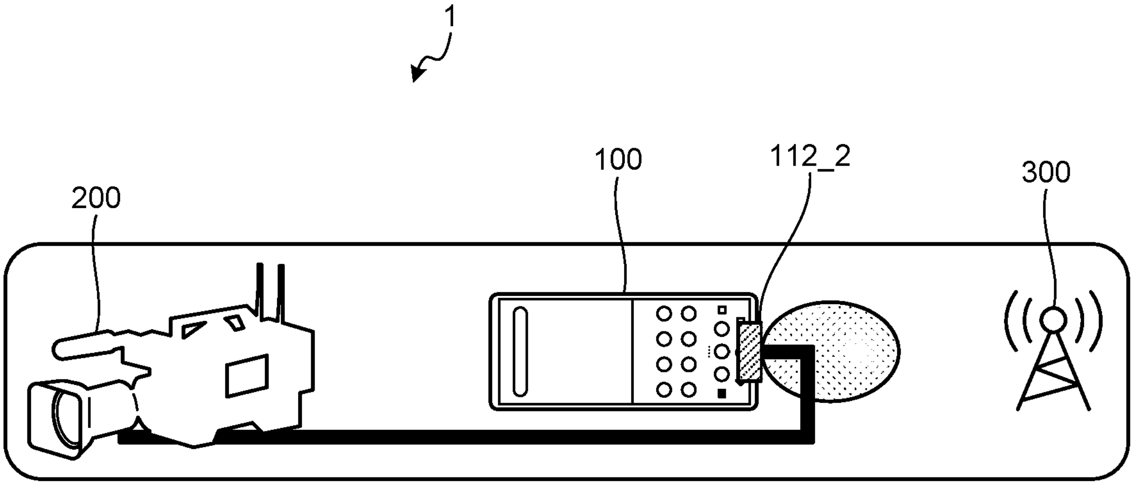
FIG. 2 is a diagram for describing communication of the communication system according to the proposed technology of the present disclosure.

Therefore, when a shielding object exists between an antenna module and a 5G base station, the communication quality of the upper NW deteriorates. For example, when the antenna module and the 5G base station are shielded by the USB cable connecting the master device 100 and the slave device 200, there is a possibility that the communication quality of the upper NW is deteriorated. Such a case will be described with reference to FIG. 2. FIG. 2 is a diagram for describing communication of the communication system 1 according to the proposed technology of the present disclosure.

As described above, the millimeter wave has high straightness and a large propagation loss. Therefore, when the master device 100 is connected to the upper NW by using millimeter waves, communication is performed using an antenna corresponding to the position of the base station 300 that performs communication. For example, in FIG. 2, since the master device 100 is used sideways, the master device 100 communicates with the base station 300 using not the antenna 112_1 (see FIG. 1) but an antenna 112_2.

At this time, as illustrated in FIG. 2, when a cable connecting the master device 100 and the slave device 200 is connected near the antenna 112_2, the cable may become a shielding object, and the communication quality between the master device 100 and the base station 300 may be deteriorated.

On the other hand, when the master device 100 selects Bluetooth (registered trademark) or Wi-Fi (registered trademark) as the lower NW while the upper NW is Wi-Fi (registered trademark), there is a possibility that a frequency band (for example, 2.4 GHz) close to the use frequency band of the upper NW is selected as the use frequency band of the lower NW. When the use frequency band of the upper NW and the use frequency band of the lower NW are close to each other, interference occurs, and the communication quality of the upper NW and the lower NW deteriorates.

When the master device 100 selects the lower communication path in consideration of usability and quality of the lower communication path with the slave device 200, the communication quality of the upper communication path is deteriorated due to the effect of the lower communication path, and as a result, the communication quality of both the upper communication path and the lower communication path is deteriorated.

As described above, in the master device 200 having the plurality of communication paths, the quality of the upper NW communication is deteriorated by the selection of the lower NW. As described above, there may be a dependence relationship between the lower NW and the upper NW.

In a case where there is a dependence relationship in the communication quality of the upper/lower NWs, there was a problem that the communication quality of one of the upper/lower NWs is improved to deteriorate the communication quality of the other, and as a result, the communication quality of both the upper and lower is deteriorated.

Since deterioration of the communication quality does not occur in the upper NW communication alone, it is difficult for the user to notice the dependence relationship between the upper NW and the lower NW and the communication quality reduced by the dependence relationship. Therefore, there was a problem that it is difficult for the user to notice that the communication quality is improved by using another communication path having no or small dependence relationship as the lower NW.

1.3. Outline of Proposed Technology

Thus, in the proposed technology of the present disclosure, the master device 100 detects whether the upper NW and the lower NW currently operating are in the dependence relationship, specifically, whether the lower NW affects the communication of the upper NW. Such detection is performed, for example, on the basis of information regarding a dependence relationship held by the master device 100 in advance.

When detecting that there is a dependence relationship, the master device 100 estimates the communication state of the communication path by the combination for each combination of the upper communication path and the lower communication path. Such estimation includes detection of the communication quality of the currently used upper communication path and lower communication path, and estimation of the communication quality of the unused upper communication path and lower communication path. Further, hereinafter, unless otherwise specified, when simply described as a communication path, it means a communication path combining the upper communication path and the lower communication path.

As described above, the master device 100 communicates with the slave device 200 using one of a plurality of lower communication paths including a wireless communication path and a wired communication path. Thus, when detecting that the upper communication path and the lower communication path have a dependence relationship, the master device 100 detects the communication quality of the lower communication path (one of the plurality of lower communication paths) currently used for connection with the slave device 200. Further, the master device 100 estimates the communication quality of the lower communication path (remaining communication paths among the plurality of lower communication paths) that can be used for connection with the slave device 200.

For example, as illustrated in FIG. 2, it is assumed that the master device 100 uses a cellular network as the upper NW and a wired network using USB as the lower NW. In the example of FIG. 2, the communication quality of the upper NW is deteriorated, and the communication quality of the lower NW is also deteriorated by the USB cable.

In this case, the master device 100 detects the dependence relationship between the upper NW and the lower NW. Thus, the master device 100 detects the current communication quality of the cellular network and the communication quality of the communication using USB.

Further, for example, the master device 100 estimates the communication quality of the communication path that can be selected as the lower NW. As described above, the master device 100 can select a plurality of communication paths such as Ethernet (registered trademark), Bluetooth (registered trademark), and Wi-Fi (registered trademark) as the lower NW with the slave device 200.

Figure 3:
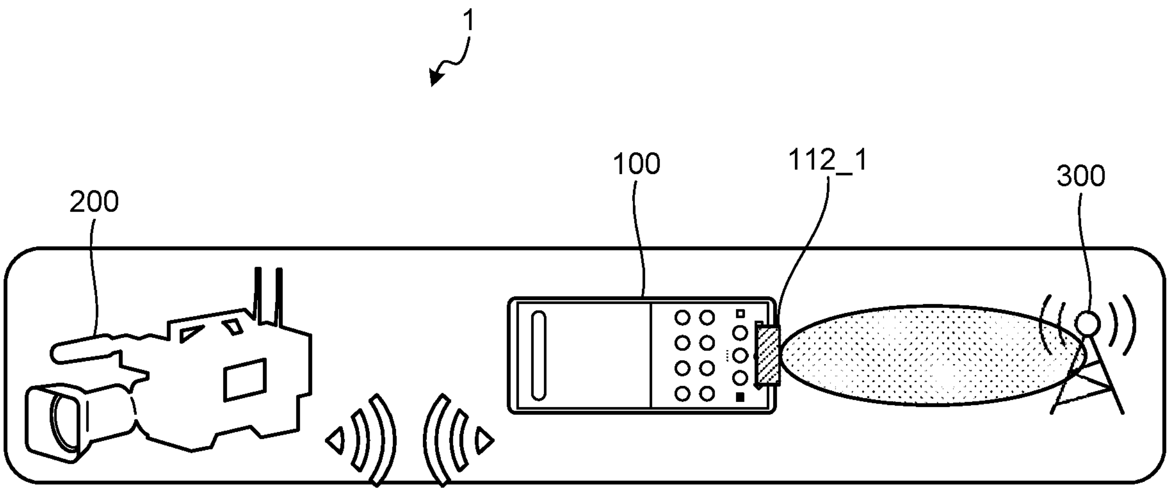
FIG. 3 is a diagram for describing communication of the communication system according to the proposed technology of the present disclosure.

Thus, the master device 100 estimates the communication quality of the plurality of communication paths that can be selected. Here, estimation of the communication quality of Wi-Fi (registered trademark) by the master device 100 will be described with reference to FIG. 3. FIG. 3 is a diagram for describing communication of the communication system 1 according to the proposed technology of the present disclosure.

As illustrated in FIG. 3, when the master device 100 communicates with the slave device 200 using Wi-Fi (registered trademark), since the master device 100 does not use a cable that inhibits communication of the upper NW, the communication quality of the upper NW is less likely to be affected as compared with the case of connection using USB. Therefore, it is estimated that the communication quality of the lower NW is improved as compared with the case of using USB.

Note that, although the case where the master device 100 estimates the communication quality of Wi-Fi (registered trademark) as the lower communication path that can be selected as the lower NW has been described here, it is not limited thereto. The master device 100 estimates the communication quality of the plurality of lower communication paths. For example, the master device 100 also estimates the communication quality of the lower communication path that can be selected as the lower NW, such as Ethernet (registered trademark) or Bluetooth (registered trademark).

In this manner, the master device 100 estimates the communication quality of the upper NW and the plurality of lower communication paths. As a result, the master device 100 can switch to the lower communication path estimated to have good communication quality, or can suggest the user to perform switching. As a result, the communication system 1 can further improve the communication quality between the slave device 200 and the base station 300.

Figure 4:
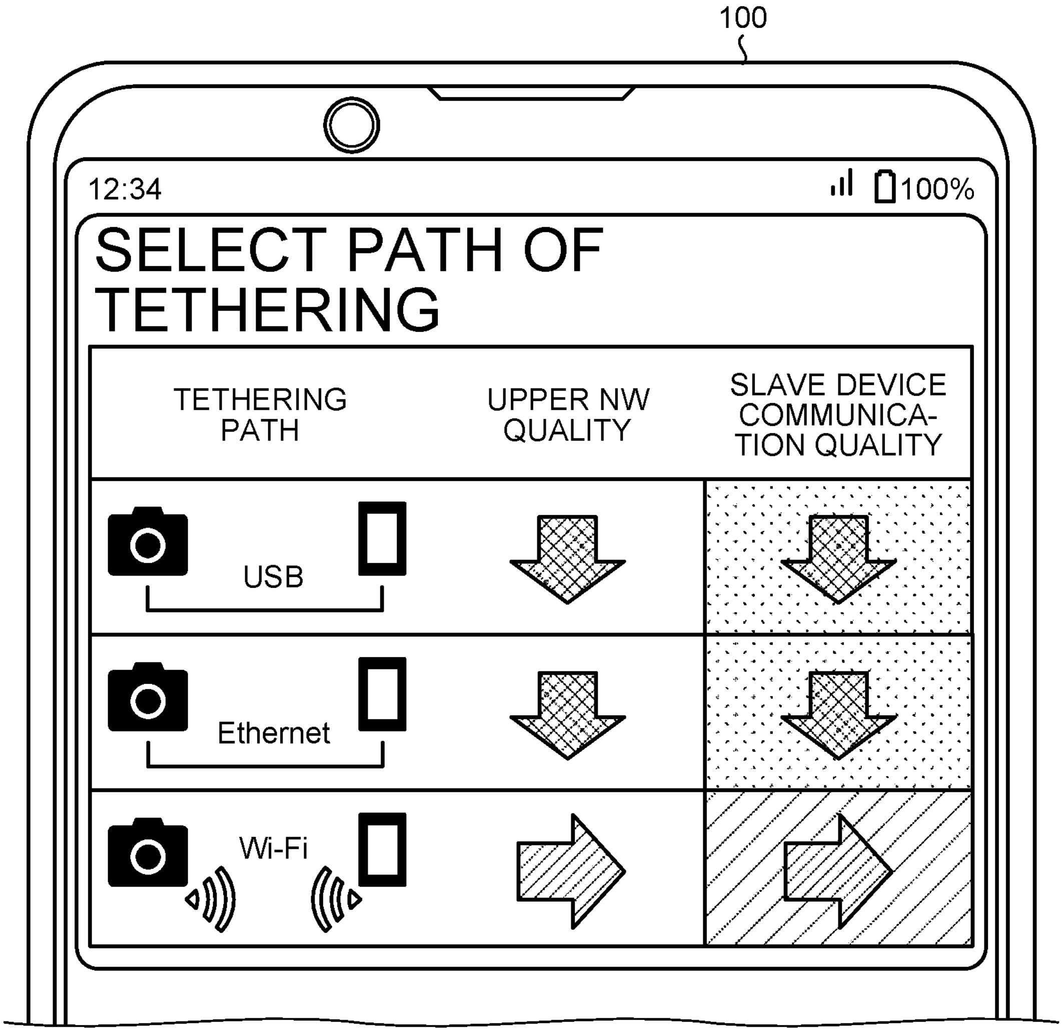
FIG. 4 is a diagram for describing a screen example presented to a user by a master device according to the proposed technology of the present disclosure.

Here, FIG. 4 is a diagram for describing a screen example presented to a user by the master device 100 according to the proposed technology of the present disclosure.

The master device 100 presents the user with information regarding the communication quality when the lower communication path is switched. In the example of FIG. 4, the master device 100 presents information indicating that the communication quality of the upper NW is reduced and the communication quality of the slave device 200 is reduced in a case where USB is used as the lower communication path.

Further, similarly, the master device 100 presents information indicating that the communication quality of the upper NW is reduced and the communication quality of the slave device 200 is reduced in a case where Ethernet (registered trademark) is used as the lower communication path. Further, when Wi-Fi (registered trademark) is used as the lower communication path, the master device 100 presents information indicating that the communication quality of the upper NW does not change (that is, not reduced) and the communication quality of the slave device 200 does not change (that is, not reduced).

In this way, when the master device 100 presents the information regarding the communication quality of the plurality of lower communication paths to the user, the user can select the lower communication path with better communication quality.

Note that, here, a case where the master device 100 prompts the user to switch the lower communication path by presenting the information regarding the communication quality of the lower communication path to the user has been described, but the master device 100 may switch the lower communication path on the basis of the estimation result. In this case, it is possible to select a lower communication path with better communication quality without bothering the user.

2. CONFIGURATION EXAMPLE

2.1. Configuration Example of Master Device

The master device 100 is a communication apparatus that communicates with other communication apparatuses such as the base station 300, the access point, and the slave device 200. The master device 100 has a tethering function (tethering host function) and relays access to the upper NW by the slave device 200.

The master device 100 is, for example, a mobile phone, a smart device (smartphone or tablet), a personal digital assistant (PDA), or a personal computer. Further, the master device 100 may be an imaging apparatus (for example, a camcorder) having a communication function, or may be a motorcycle, a moving relay vehicle, or the like on which communication equipment such as a field pickup unit (FPU) is mounted. Further, the master device 100 may be a Machine to Machine (M2M) device or an Internet of Things (IoT) device. The master device 100 may be a router having a plurality of communication paths.

Further, the master device 100 may be able to perform LPWA communication with other communication apparatuses (for example, the base station 300, the access point, and the slave device 200). Further, the wireless communication used by the master device 100 may be wireless communication using millimeter waves. Note that the wireless communication used by the master device 100 may be wireless communication using radio waves or wireless communication (optical wireless) using infrared rays or visible light. For example, the master device 100 performs wireless communication using millimeter waves with the base station apparatus 300 and the access point. For example, the master device 100 performs wireless communication or wired communication using radio waves, infrared rays, or visible light with the slave device 200.

Further, the master device 100 may be a mobile body apparatus. The mobile body apparatus is a mobile wireless communication apparatus. At this time, the master device 100 may be a wireless communication apparatus installed in a mobile body, or may be a mobile body itself. For example, the master device 100 may be a vehicle that moves on a road, such as an automobile, a bus, a truck, or a motorcycle, or a wireless communication apparatus mounted on the vehicle. Note that the mobile body may be a mobile terminal, or may be a mobile body that moves on land, in the ground, over water, or under water. Further, the mobile body may be a mobile body that moves inside the atmosphere, such as a drone or a helicopter, or may be a mobile body that moves outside the atmosphere, such as an artificial satellite.

The master device 100 may be simultaneously connected to a plurality of base stations or a plurality of cells to perform communication. For example, in a case where one base station supports a communication area via a plurality of cells (for example, pCell, sCell), the plurality of cells can be bundled to enable communication between the base station and the master device 100 by a carrier aggregation (CA) technology, a dual connectivity (DC) technology, or a multi-connectivity (MC) technology. Alternatively, the master device 100 and the plurality of base stations can communicate by a coordinated multi-point transmission and reception (CoMP) technology via cells of different base stations.

Figures 5, 6:
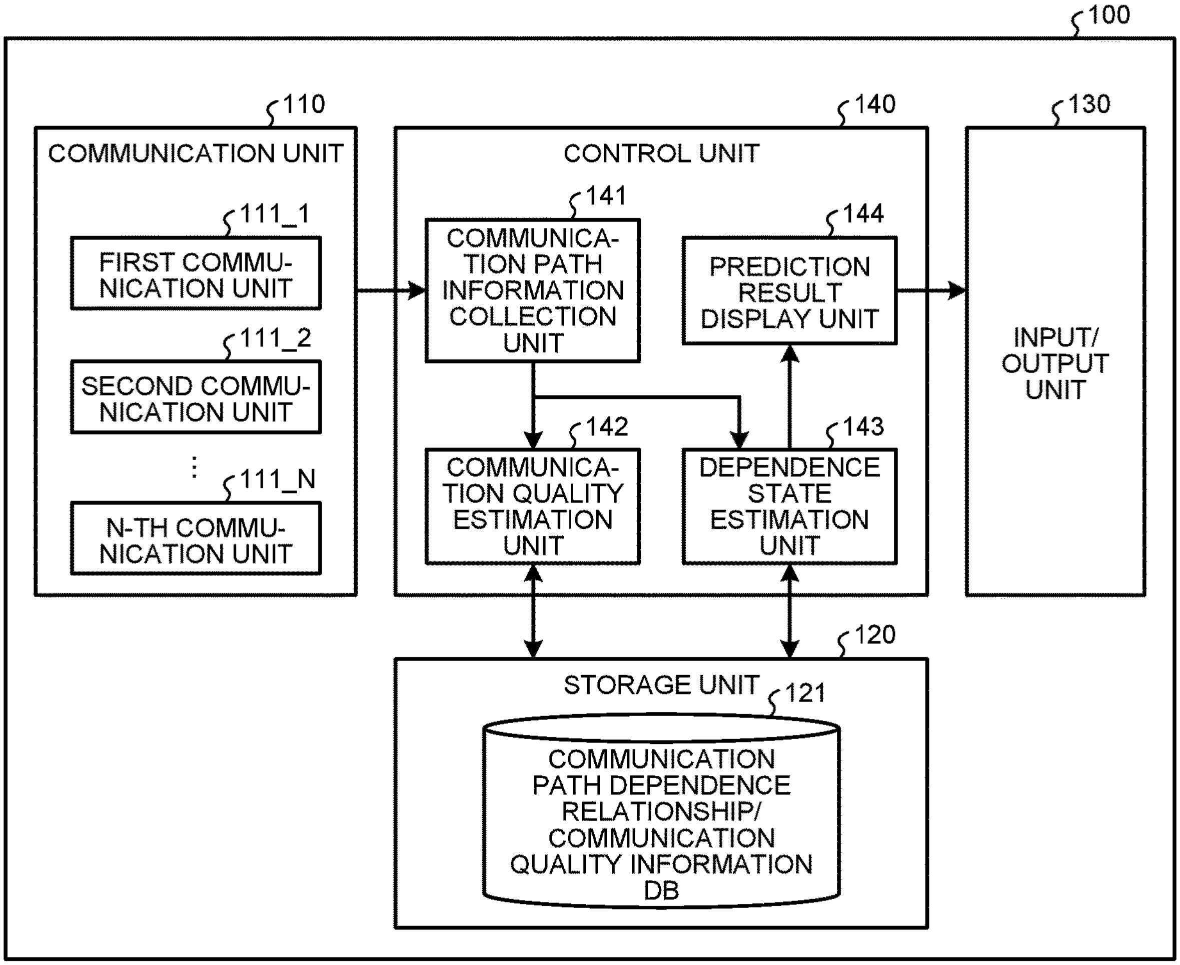
FIG. 5 is a block diagram illustrating an example of a configuration of a master device according to an embodiment of the present disclosure.
FIG. 6 is a table describing an example of dependence information according to an embodiment of the present disclosure.

FIG. 5 is a block diagram illustrating an example of a configuration of the master device 100 according to an embodiment of the present disclosure. Referring to FIG. 5, the master device 100 includes a communication unit 110, a storage unit 120, an input/output unit 130, and a control unit 140. Note that the configuration illustrated in FIG. 5 is a functional configuration, and the hardware configuration may be different from the functional configuration. Further, the functions of the master device 100 may be implemented in a distributed manner in a plurality of physically separated configurations.

(1) Communication Unit 110

The communication unit 110 includes first to N-th communication units 111_1 to 111_N (N is a natural number). An n-th communication unit 111_*n* (n=a natural number of 1 to N) is a communication interface for communicating with another apparatus. For example, the n-th communication unit 111_*n* is a network interface. For example, the n-th communication unit 111_*n* is a local area network (LAN) interface such as a network interface card (NIC). Note that the n-th communication unit 111_*n* may be a wired interface or a wireless interface. The n-th communication unit 111_*n* functions as a communication means of the master device 100. The n-th communication unit 111_*n* communicates with the slave device 200 and the base station 300 under the control of the control unit 140.

In accordance with an instruction from the control unit 140, the communication unit 110 communicates with the base station 300 (see FIG. 1) using one of the first to N-th communication units 111_1 to 111_N (for example, an L-th communication unit 111_L (L is a natural number of 1 to N)). In this case, the L-th communication unit 111_L functions as an upper communication unit. Further, an upper communication path is formed between the L-th communication unit 111_L and the base station 300.

In accordance with an instruction from the control unit 140, the communication unit 110 uses one of the first to N-th communication units 111_1 to 111_N (for example, an M-th communication unit 111_M (M is a natural number of 1 to N)) to communicate with the slave device 200 (see FIG. 2). In this case, the M-th communication unit 111_M functions as a lower communication unit. Further, a lower communication path is formed between the M-th communication unit 111_M and the slave device 200.

(2) Storage Unit 120

The storage unit 120 is a storage apparatus capable of reading and writing data, such as DRAM, SRAM, flash memory, or a hard disk. The storage unit 120 functions as a storage means of the master device 100. The storage unit 120 stores, for example, a communication path dependence relationship/communication quality information database (DB: date table) 121. The communication path dependence relationship/communication quality information database 121 is, for example, a database that stores information (hereinafter, also described as dependence information or effect information) regarding the dependence relationship between the upper communication path and the lower communication path and the communication quality of each communication path.

The dependence information includes information regarding the communication quality of the upper communication path and the lower communication path. The dependence information is obtained in advance by, for example, simulation or experiment at the time of development, and is stored in the communication path dependence relationship/communication quality information database 121 of the storage unit 120 by the time of shipment.

Here, an example of the dependence information will be described with reference to FIGS. 6 to 9. FIGS. 6 to 9 are tables describing an example of dependence information according to the embodiment of the present disclosure. FIG. 6 illustrates an example of the dependence information in a case where the upper communication path is Ethernet (registered trademark). FIG. 7 illustrates an example of the dependence information in a case where the upper communication path is BT (Bluetooth (registered trademark)). FIG. 8 illustrates an example of the dependence information in a case where the upper communication path is a WLAN such as Wi-Fi (registered trademark). FIG. 9 illustrates an example of the dependence information in a case where the upper communication path is cellular.

FIGS. 6 to 9 illustrate the case of Eth (Ethernet (registered trademark)), USB, BT (Bluetooth (registered trademark)), and WLAN as the lower communication path. In FIGS. 6 to 9, how much the throughput is reduced at the time of tethering as compared with the time of non-tethering is indicated as the throughput deterioration degree. The non-tethering means that communication is performed using the upper communication path without using the lower communication path, and the time of tethering means that communication is performed using both the upper and lower communication paths.

For example, as illustrated in FIG. 6, in a case where the upper communication path is (Ethernet (registered trademark)), since wired connection is not selected as the lower communication path, Eth (Ethernet (registered trademark)) and USB are "N/A". Further, BT (Bluetooth (registered trademark)) and WLAN of the lower communication path do not affect the upper communication path, and thus are "0%".

Further, as illustrated in FIG. 7, in a case where the upper communication path is BT (Bluetooth (registered trademark)), the upper communication path is not affected regardless of what the lower communication path is, and thus "0%" is indicated for all items.

As illustrated in FIG. 8, in a case where the upper communication path is BT (Bluetooth (registered trademark)), since the wired connection does not affect the upper communication path, Eth (Ethernet (registered trademark)) and USB are "0%". On the other hand, when the same BT (Bluetooth (registered trademark)) is used as the lower communication path or when WLAN is used as the lower communication path, the use frequency bands of the upper communication path and the lower communication path are close to each other. Therefore, when BT (Bluetooth (registered trademark)) or WLAN is selected as the lower communication path, the throughput deterioration degree becomes "−20%" as illustrated in FIG. 8.

As illustrated in FIG. 9, in a case where the upper communication path is cellular, since BT (Bluetooth (registered trademark)) and WLAN having different use frequency bands do not affect the upper communication path, the throughput deterioration degree is "0%". On the other hand, in the priority connection, for example, since the millimeter wave is shielded by the cable, there is a possibility of affecting the cellular that is the upper communication path, and thus, the throughput deterioration degree is "−30%".

For example, when tethering is started by selecting one of the plurality of upper communication paths and selecting one of the plurality of lower communication paths, the control unit 140 to be described below refers to the dependence information in the communication path dependence relationship/communication quality information database 121. Based on the reference result, the control unit 140 detects whether or not the lower communication path affects the upper communication path, that is, whether or not the upper NW and the lower NW are in a dependence relationship. Further, the dependence information is used for detection and estimation of the communication quality of each communication path by the control unit 140. Details of detection of the dependence relationship and detection and estimation of the communication quality by the control unit 140 will be described below.

Note that, here, the communication path dependence relationship/communication quality information database 121 stores the dependence information for each upper communication path, but it is not limited thereto. For example, the dependence information illustrated in FIGS. 6 to 9 may be collectively stored as one piece of information in the communication path dependence relationship/communication quality information database 121.

Further, here, the communication path dependence relationship/communication quality information database 121 stores the dependence relationship in association with the lower communication path for each bearer such as cellular or WLAN as the upper communication path, but it is not limited thereto.

Examples of the category of the upper communication path associated with the lower communication path include those described below. The communication path dependence relationship/communication quality information database 121 stores the dependence relationship in association with the lower communication path by, for example, one or a combination of a plurality of those described below.

Examples of the category include a frequency band, a channel, and signal strength used by each communication path, and physical layer information such as a communication standard/protocol and a method.

Examples of the communication standard include 802.11b/g/n/ax and WDCMA (registered trademark)/LTE/NR. The communication path dependence relationship/communication quality information database 121 may store the dependence relationship in association with the lower communication path for each of these communication standards.

Further, examples of the category include information regarding antenna modules associated with each communication path at the time of communication. Alternatively, examples of the category include a service set identifier (SSID), a basic service set identifier (BSSID), cell/adjacent cell information, and connection destination information such as a MAC address of the connection destination.

As described above, by subdividing the category of the upper communication path and associating the dependence relationship, the control unit 140 can detect the dependence state at a more practical timing. For example, in a case where the upper communication path is cellular, in a case where a predetermined antenna module is used, the control unit 140 can detect the dependence relationship at a finer timing such that the dependence relationship with the wired connection occurs.

Alternatively, in a case where the upper communication path is WLAN, in a case where a predetermined frequency band (for example, 2.4 GHz band) is used, the same applies to a case where the dependence relationship with Bluetooth (registered trademark) occurs.

Further, in FIGS. 6 to 9, the case where the throughput deterioration degree is used as an index as the dependence information has been described, but it is not limited thereto. For example, the deterioration degree of communication quality such as delay, jitter, and a packet loss rate may be used as an index of the dependence information.

Further, as an index of the dependence information, a specific numerical value (for example, in the case of throughput, 100 Mbps or the like) may be used in addition to a relative value such as the deterioration degree.

Alternatively, as an index of the dependence information, a higher-level conceptualized index, for example, a time required for downloading data of a predetermined size such as a 1 GB file or profile and level information associated with a particular movie compression standard may be used. Examples of the movie compression standard include H.264 Baseline 4.1, 5, and the like.

In this way, by using a higher-level conceptualized index as the index of the dependence information, it is possible to present the user with the quality and the tethering environment according to the use case (for example, download of a file) of the user.

FIG. 10 is a table illustrating another example of the dependence information according to the embodiment of the present disclosure. FIG. 10 illustrates a case where the cellular of the upper communication path is further subdivided as compared with FIGS. 6 to 9. Further, FIG. 10 illustrates a case where Uplink throughput is used as the index of the dependence information.

As illustrated in FIG. 10, in a case where the upper communication path is cellular, the upper communication path and the lower communication path are associated by dividing the cellular into the use frequency band (millimeter wave or Other) and the use antenna module (Main Ant #1 and #2).

Further, the field of the lower communication path "Absent" indicates the throughput at the time of non-tethering. For example, in the example of FIG. 10, when the upper communication path is WLAN, the throughput is 300 Mbps regardless of the type of the lower communication path. Further, even when the upper communication path is millimeter wave cellular communication using Main Ant #1, the throughput is 800 Mbps regardless of the type of the lower communication path. In this case, it is indicated that the upper communication path and the lower communication path are not in a dependence relationship.

On the other hand, in a case where the upper communication path is millimeter wave cellular communication using Main Ant #2, the throughput in a case where wired connection (Eth (Ethernet (registered trademark)) and USB) is selected as the lower communication path is 600 Mbps. The throughput at the time of non-tethering (in a case where the lower communication path "Absent") or when WLAN is selected as the lower communication path is 800 Mbps. As described above, when the upper communication path is millimeter wave cellular using Main Ant #2, the dependence relationship occurs between the upper communication path and the lower communication path that is a wired connection.

As described above, even in a case where the upper communication path is millimeter wave cellular communication, when the antenna module to be used is different, the dependence relationship with the lower communication path may change (see, for example, FIGS. 1 and 2).

Note that the above-described dependence information is stored in the storage unit 120 in advance, but it is not limited thereto. For example, the dependence information may be updated by the control unit 140 described below. For example, the control unit 140 updates the dependence information according to the communication path information and the communication quality calculated when the actual communication is performed. Details of the update of the dependence information will be described below.

Further, in the above-described dependence information, the case where the category of the upper communication path is subdivided has been described, but the category of the lower communication path can also be subdivided similarly to the upper communication path.

(3) Input/Output Unit 130

Returning to FIG. 5. The input/output unit 130 is a user interface for exchanging information with the user. For example, the input/output unit 130 is an operation apparatus for the user to perform various operations, such as a keyboard, a mouse, an operation key, and a touch panel. Alternatively, the input/output unit 130 is a display apparatus (display unit) such as a liquid crystal display or an organic electroluminescence (EL) display. The input/output unit 130 may be an acoustic apparatus such as a speaker or a buzzer. Further, the input/output unit 130 may be a lighting apparatus such as a light emitting diode (LED) lamp. The input/output unit 130 functions as an input/output means (input means, output means, operation means, notification means, or display means) of the master device 100.

(4) Control Unit 140

The control unit 140 is a controller that controls each unit of the master device 100. The control unit 140 is achieved by, for example, a processor such as a CPU or an MPU. For example, the control unit 140 is achieved by the processor executing various programs stored in the storage apparatus inside the master device 100 using RAM or the like as a work area. Note that the control unit 140 may be achieved by, for example, an integrated circuit such as an ASIC or an FPGA. Any of the CPU, the MPU, the ASIC, and the FPGA can be regarded as a controller. Further, the control unit 140 may be achieved by a GPU in addition to or instead of the CPU.

The control unit 140 includes a communication path information collection unit 141, a communication quality estimation unit 142, a dependence state estimation unit 143, and a prediction result display unit 144. Each block (the communication path information collection unit 141 to the prediction result display unit 144) constituting the control unit 140 is a functional block indicating the function of the control unit 140. These functional blocks may be software blocks or hardware blocks. For example, each of the functional blocks described above may be one software module achieved by software (including microprogram), or may be one circuit block on a semiconductor chip (die). Of course, each functional block may be one processor or one integrated circuit. The control unit 140 may be configured by a functional unit different from the above-described functional block. A configuration method of the functional block is arbitrary.

(Communication Path Information Collection Unit 141)

The communication path information collection unit 141 acquires communication path information regarding the communication path from the communication unit 110. The communication path information collection unit 141 outputs the acquired communication path information to the communication quality estimation unit 142 and the dependence state estimation unit 143.

(Communication Quality Estimation Unit 142)

The communication quality estimation unit 142 estimates the communication quality of the communication path on the basis of the communication path information regarding the communication path collected by the communication path information collection unit 141, and updates the dependence information stored in the communication path dependence relationship/communication quality information database 121.

The communication quality estimation unit 142 can estimate the communication quality using, for example, Link Speed information that can be acquired from a link layer of each communication path being connected or a theoretical value associated with a protocol of each communication path as a reference value. For example, in a case where 802.11b/g/n/ax is exemplified as the protocol of the communication path, the communication quality estimation unit 142 estimates the communication quality using the theoretical value of the throughput of each of 802.11b/g/n/ax as a reference value.

Alternatively, the communication quality estimation unit 142 may estimate, for example, the signal strength (for example, a reference signal strength indicator (RSSI)), a use channel, and a frequency bandwidth in each communication path by a general throughput theoretical value calculation formula. Further, the communication quality estimation unit 142 may estimate the communication quality using, for example, Deep Learning for inferring the communication quality using various elements including the communication path information as input parameters.

Further, for example, the communication quality estimation unit 142 may calculate the communication quality from the actual communication packet. For example, the communication quality estimation unit 142 calculates the throughput from the size per unit time. Alternatively, the communication quality estimation unit 142 may calculate, for example, a delay from a round trip time (RTT) and a packet loss rate from the number of times of transmission control protocol (TCP) retransmission as the communication quality.

The communication quality estimation unit 142 updates the dependence information stored in the communication path dependence relationship/communication quality information database 121 using the estimated or calculated communication quality. Alternatively, the communication quality estimation unit 142 may store the estimated or calculated communication quality in the storage unit 120 as new dependence information.

The communication quality estimation unit 142 estimates or calculates the communication quality using the communication path information, so that the master device 100 can present a more accurate quality estimation result to the user.

Note that the upper limit of the communication quality the slave device 200 enjoys is a path of one of the upper and lower communication paths that is a bottleneck, for example, in the case of throughput. Further, the delay is approximated to the sum of the delay between the master device 100 and the slave device 200 and the delay from the master device 100 to the destination via the upper NW. Therefore, the delay between the master device 100 and the slave device 200 can greatly affect the communication quality between the master device 100 and the slave device 200.

The measurement of the communication quality between the master device 100 and the slave device 200 can be calculated from the total number of Internet Protocol (IP) packets from a specific port and destination per unit time, and direct communication such as ARP/ICMP and Neighbor Discovery between the master and slave equipment. However, in this case, it is assumed that some conditions are satisfied, for example, the IP packet is not encrypted or subjected to network address translation (NAT) or network address port translation (NAPT).

Further, as described above, the communication quality can be calculated using a higher-level conceptualized index such as the time required for downloading data of a predetermined size (hereinafter, also referred to as download completion time). In this case, the communication quality estimation unit 142 may use L2 information such as a MAC address, or L3 or higher information such as IPv4/v6, a transmission/reception address, a port number, or TX/RX as additional information of the communication quality.

Alternatively, the communication quality estimation unit 142 may use information regarding each upper layer, for example, H.264/H.265, which is movie compression standard information, and a profile level associated therewith as the additional information. Further, the communication quality estimation unit 142 may perform app identification by Deep Packet Inspection (a.k.a DPI).

As a result, the master device 100 can provide the user with information in accordance with the layer of the quality of an upper app that is affected by the deterioration of the communication quality. For example, the master device 100 can present FTP transmission throughput for a specific server (illustration omitted)) and a movie resolution/frame rate to the user.

As described above, the communication quality estimation unit 142 estimates and calculates the communication quality, so that the control unit 140 can handle the communication quality on the user's actual environment such as the execution speed and the delay as an absolute value. Further, the control unit 140 can personalize the dependence information according to the communication usage status of the user, and can present information regarding a more optimal communication environment suitable for the user to the user.

(Dependence State Estimation Unit 143)

The dependence state estimation unit 143 detects the dependence relationship between the upper NW and the lower NW at the start of tethering, and estimates the communication states of the upper communication path and the lower communication path. The dependence state estimation unit 143 outputs the estimation result to the prediction result display unit 144.

More specifically, the dependence state estimation unit 143 detects, for example, the upper NW and the lower NW used for tethering. The dependence state estimation unit 143 detects whether or not the upper NW and the lower NW are in a dependence relationship with reference to the communication path dependence relationship/communication quality information database 121.

For example, the dependence state estimation unit 143 refers to any one of the pieces of dependence information in FIGS. 6 to 9 according to the detected type of the upper NW. The dependence state estimation unit 143 detects the dependence relationship according to whether or not the throughput is deteriorated by using the communication path corresponding to the detected lower NW on the basis of the dependence information. More specifically, the dependence state estimation unit 143 detects the dependence relationship by comparing, for example, the throughput deterioration degree with a predetermined threshold value.

For example, in a case where the upper communication path is cellular, when detecting WLAN as the lower communication path, the dependence state estimation unit 143 detects that there is no dependence relationship between the upper NW and the lower NW since the deterioration degree of throughput is "0%" (see FIG. 9). On the other hand, when USB is detected as the lower communication path, since the deterioration degree of throughput is "−30%", it is detected that there is a dependence relationship between the upper NW and the lower NW (see FIG. 9).

When detecting that there is a dependence relationship between the upper NW and the lower NW, the dependence state estimation unit 143 estimates the communication state for each combination of the plurality of lower communication paths and at least one upper communication path. For example, the dependence state estimation unit 143 estimates the communication state for each combination by acquiring the communication quality estimated by the communication quality estimation unit 142.

Note that, since the communication state of the communication path changes according to the dependence state between the upper communication path and the lower communication path, estimation of the communication state may be hereinafter referred to as estimation of the dependence state.

The dependence state estimation unit 143 outputs the estimation result to the prediction result display unit 144.

(Prediction Result Display Unit 144)

The prediction result display unit 144 presents information regarding the dependence state to the user on the basis of the estimation result by the dependence state estimation unit 143.

For example, when the dependence relationship between the upper NW and the lower NW is detected by the dependence state estimation unit 143, the prediction result display unit 144 presents the information regarding the dependence relationship to the user. The prediction result display unit 144 presents, for example, information regarding the upper NW affected by the lower NW to the user. More specifically, for example, the prediction result display unit 144 presents to the user that the millimeter wave antenna module being used is affected by USB or that it is not affected in the case of Wi-Fi (registered trademark).

Figure 11:
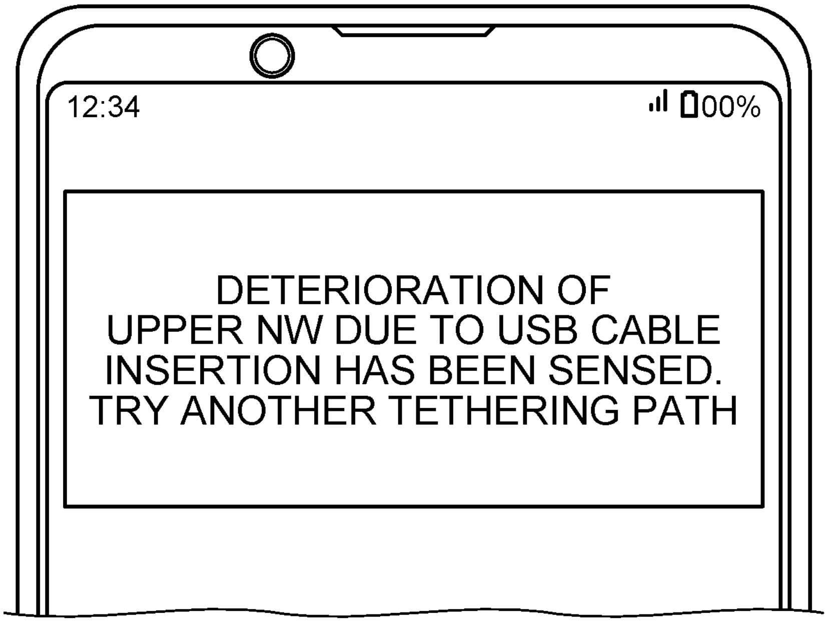
FIG. 11 is a diagram for describing an example of presentation information presented to a user by a prediction result display unit according to an embodiment of the present disclosure.

FIG. 11 is a diagram for describing an example of presentation information presented to a user by the prediction result display unit 144 according to the embodiment of the present disclosure.

As illustrated in FIG. 11, the prediction result display unit 144 presents, to the user, text indicating that the deterioration of the upper NW has been sensed due to the insertion of a USB cable. Further, the prediction result display unit 144 may also present text prompting the user to try another tethering path.

As a result, the user can notice an environment in which the communication quality of tethering is deteriorated or an environment in which the communication quality is not deteriorated.

Further, the prediction result display unit 144 may present the index of the dependence information in the presentation information to the user. For example, the prediction result display unit 144 may present the communication quality such as throughput and an absolute value of delay, a download completion time of data of a predetermined size, and the like to the user. Alternatively, the prediction result display unit 144 may present a percentage of the communication quality that may be improved by switching the lower communication path to the user.

Figure 12:
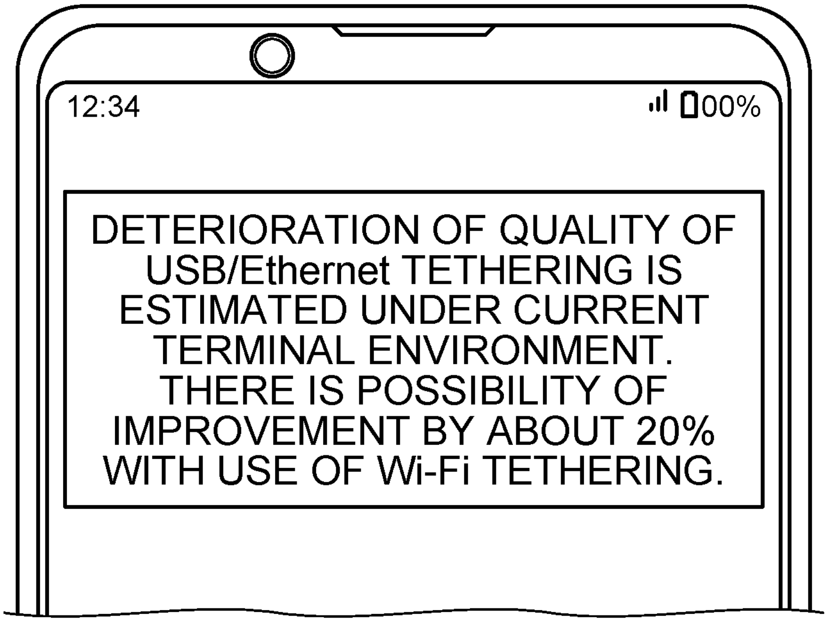
FIG. 12 is a diagram for describing another example of presentation information presented to a user by a prediction result display unit according to an embodiment of the present disclosure.

FIG. 12 is a diagram for describing another example of presentation information presented to the user by the prediction result display unit 144 according to the embodiment of the present disclosure.

As illustrated in FIG. 12, in the case of the current terminal environment, the prediction result display unit 144 presents text indicating that the quality deterioration of tethering (USB/Ethernet (registered trademark) tethering) by the wired connection is estimated to the user. Further, the prediction result display unit 144 presents text indicating that there is a possibility that the communication quality is improved by about 20% with use of Wi-Fi (registered trademark) tethering to the user.

As described above, the prediction result display unit 144 presents the information regarding the index of the communication quality to the user, so that the user can select the switching of the communication path on the basis of the information regarding the specific communication quality.

Further, the prediction result display unit 144 may recommend the user's action for improving the communication quality. The user's action includes, for example, switching to a predetermined communication path such as use of Wi-Fi (registered trademark) tethering (see FIG. 12), a change in the orientation or position of the master device 100, and the like. Alternatively, assuming that the position of the base station 300 (see FIG. 1), the access point, or the like with which the master device 100 communicates via the upper communication path can be changed, the prediction result display unit 144 may recommend a change in the arrangement of the base station 300 or the access point.

Figure 13:
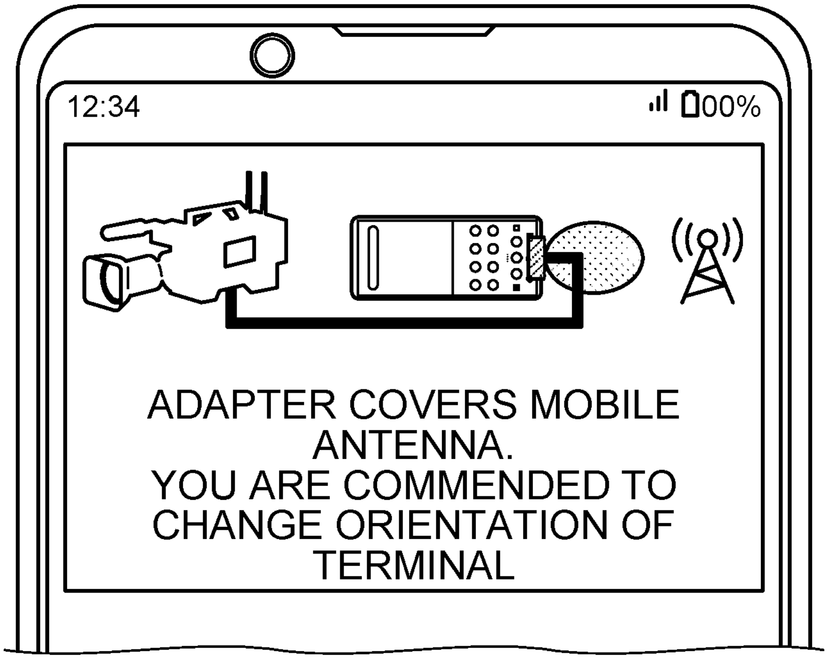
FIG. 13 is a diagram for describing another example of presentation information presented to a user by a prediction result display unit according to an embodiment of the present disclosure.

FIG. 13 is a diagram for describing another example of presentation information presented to the user by the prediction result display unit 144 according to the embodiment of the present disclosure.

As illustrated in FIG. 13, the prediction result display unit 144 presents, to the user, text indicating that an adapter for wired connection covers a mobile antenna (an example of the antenna module used in the upper communication path) and recommending a change in the orientation of the terminal (master device 100).

As a result, the user can suppress the deterioration of the communication quality by following the instruction from the master device 100 without making the determination regarding the communication quality by himself/herself.

Note that the prediction result display unit 144 may present the presentation information to the user before the communication in the detected upper communication path and lower communication path is performed, or may present the presentation information at a timing when the communication is actually performed and the communication quality is deteriorated. Further, the prediction result display unit 144 may continue to present the presentation information to the user while the lower communication path affects the upper communication path, or may present the presentation information to the user for a predetermined period after the effect is detected.

Further, here, the prediction result display unit 144 presents the presentation information when tethering is started or deterioration of communication quality occurs, but it is not limited thereto.

For example, the prediction result display unit 144 may present the presentation information to the user in order to prevent deterioration that does not currently occur. For example, the prediction result display unit 144 may present to the user that there is a possibility that the communication quality deteriorates by changing to the wired connection in a state where the WLAN is used as the lower communication path. Alternatively, the prediction result display unit 144 may present to the user that there is a possibility that the communication quality deteriorates due to a change in the orientation or position of the master device 100, the arrangement of the base station 300 or the access point, and the like.

In this case, the dependence state estimation unit 143 estimates the communication quality for each combination of the upper communication path and the lower communication path even when the dependence relationship is not detected.

Note that, here, the dependence information is stored in the storage unit 120, but it is not limited thereto. For example, in a case where the communication system 1 includes a plurality of communication apparatuses 100 that operates as master devices, the plurality of communication apparatuses 100 may share the dependence information.

Alternatively, the communication system 1 may include an information processing apparatus (illustration omitted) that manages the dependence information. In this case, the dependence information used by the plurality of communication apparatuses 100 can be managed, for example, by one information processing apparatus. For example, the information processing apparatus may perform centralized management such as Federated Learning in Deep Learning, and perform learning using information collected by the plurality of communication apparatuses 100 to manage and update the dependence information.

In this manner, by sharing or updating the dependence information with the plurality of communication apparatuses 100, the accuracy of the dependence information can be further improved.

2.2. Configuration Example of Slave Device

Next, a configuration of the slave device 200 will be described.

The slave device 200 is a communication apparatus that communicates with another communication apparatus such as the master device 100. The slave device 200 has a tethering function (tethering client function) and accesses an upstream network via the master device 100. Note that the slave device 200 may have a function of directly accessing the upstream network without using the master device 100. For example, the slave device 200 may be directly accessible to the base station or the access point directly.

The slave device 200 is, for example, a mobile phone, a smart device (smartphone or tablet), a PDA, or a personal computer. Further, the slave device 200 may be an imaging apparatus (for example, a camcorder) having a communication function, or may be a motorcycle, a moving relay vehicle, or the like on which communication equipment such as an FPU is mounted. Further, the slave device 200 may be an M2M device or an IoT device. The slave device 200 may be a router.

Further, the slave device 200 may be able to perform LPWA communication with other communication apparatuses (for example, the master device 100). Further, the wireless communication used by the slave device 200 may be wireless communication using millimeter waves. Note that the wireless communication used by the slave device 200 may be wireless communication using radio waves or wireless communication (optical wireless) using infrared rays or visible light.

Further, the slave device 200 may be a mobile body apparatus. The mobile body apparatus is a mobile wireless communication apparatus. At this time, the slave device 200 may be a wireless communication apparatus installed in a mobile body, or may be a mobile body itself. For example, the slave device 200 may be a vehicle that moves on a road, such as an automobile, a bus, a truck, or a motorcycle, or a wireless communication apparatus mounted on the vehicle. Note that the mobile body may be a mobile terminal, or may be a mobile body that moves on land, in the ground, over water, or under water. Further, the mobile body may be a mobile body that moves inside the atmosphere, such as a drone or a helicopter, or may be a mobile body that moves outside the atmosphere, such as an artificial satellite.

Figure 14:
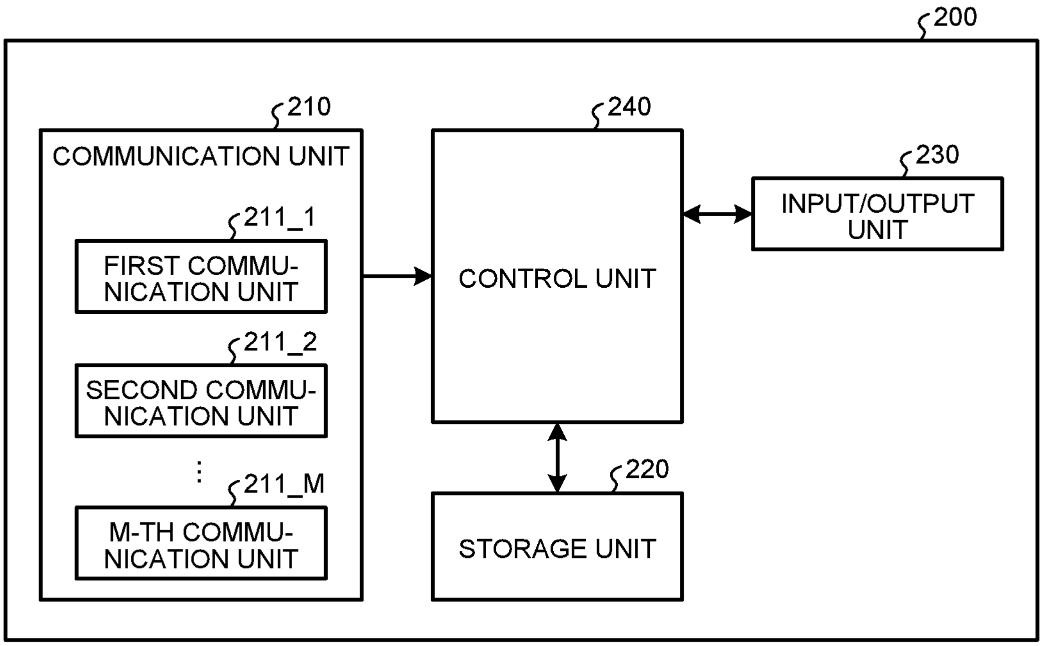
FIG. 14 is a block diagram illustrating an example of a configuration of a slave device according to an embodiment of the present disclosure.

FIG. 14 is a block diagram illustrating an example of a configuration of the slave device 200 according to the embodiment of the present disclosure. Referring to FIG. 14, the slave device 200 includes a communication unit 210, a storage unit 220, an input/output unit 230, and a control unit 240. Note that the configuration illustrated in FIG. 14 is a functional configuration, and the hardware configuration may be different from the functional configuration. Further, the functions of the slave device 200 may be implemented in a distributed manner in a plurality of physically separated configurations.

(1) Communication Unit 210

The communication unit 210 includes first to N-th communication units 211_1 to 211_N (N is a natural number). An n-th communication unit 211_*n* (n=a natural number of 1 to N) is a communication interface for communicating with another apparatus. For example, the n-th communication unit 211_*n* is a network interface. For example, the n-th communication unit 211_*n* is a local area network (LAN) interface such as a network interface card (NIC). Note that the n-th communication unit 211_*n* may be a wired interface or a wireless interface. The n-th communication unit 211_*n* functions as a communication means of the slave device 200. The n-th communication unit 211_*n* communicates with the master device 100 under the control of the control unit 240.

In accordance with an instruction from the control unit 240, the communication unit 210 uses one of the first to N-th communication units 211_1 to 211_N (for example, an M-th communication unit 211_M (M is a natural number of 1 to N)) to communicate with the master device 100 (see FIG. 2). As a result, a lower communication path is formed between the M-th communication unit 211_M and the master device 100.

(2) Storage Unit 220

The storage unit 220 is a storage apparatus capable of reading and writing data, such as DRAM, SRAM, flash memory, or a hard disk. The storage unit 220 functions as a storage means of the slave device 200.

(3) Input/Output Unit 230

The input/output unit 230 is a user interface for exchanging information with the user. For example, the input/output unit 230 is an operation apparatus for the user to perform various operations, such as a keyboard, a mouse, an operation key, and a touch panel. Alternatively, the input/output unit 230 is a display apparatus (display unit) such as a liquid crystal display or an organic electroluminescence display. The input/output unit 230 may be an acoustic apparatus such as a speaker or a buzzer. Further, the input/output unit 230 may be a lighting apparatus such as a light emitting diode (LED) lamp. The input/output unit 230 functions as an input/output means (input means, output means, operation means, notification means, or display means) of the slave device 200.

(4) Control Unit 240

The control unit 240 is a controller that controls each unit of the master device 100. The control unit 240 is achieved by, for example, a processor such as a CPU or an MPU. For example, the control unit 240 is achieved by the processor executing various programs stored in the storage apparatus inside the slave device 200 using RAM or the like as a work area. Note that the control unit 240 may be achieved by, for example, an integrated circuit such as an ASIC or an FPGA. Any of the CPU, the MPU, the ASIC, and the FPGA can be regarded as a controller. Further, the control unit 240 may be achieved by a GPU in addition to or instead of the CPU.

3. INFORMATION PROCESSING BY MASTER DEVICE

3.1. Update Processing of Dependence Information

Figure 15:
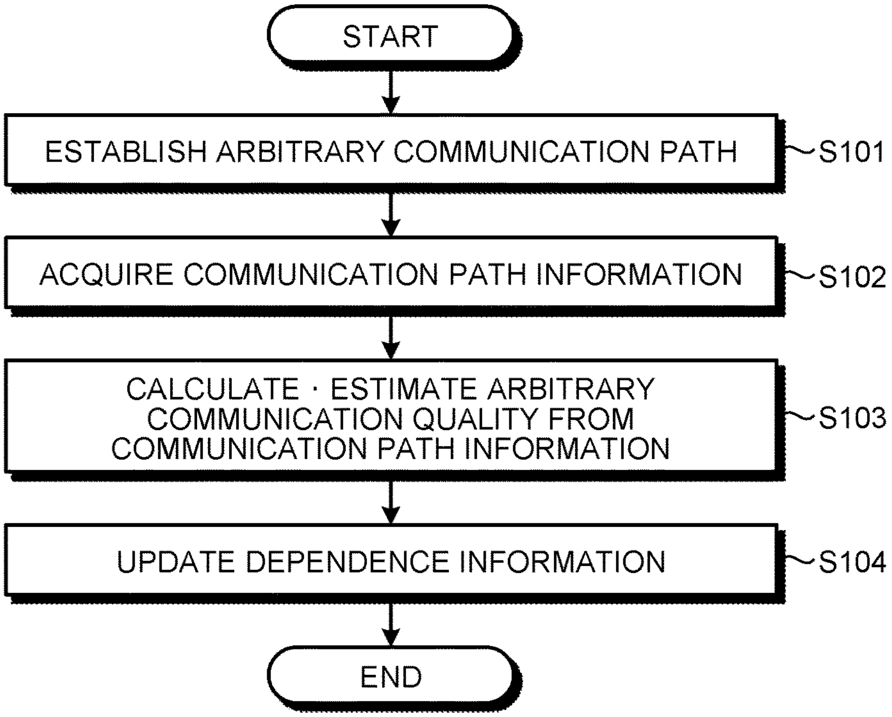
FIG. 15 is a flowchart illustrating an example of update processing according to an embodiment of the present disclosure.

Next, dependence information update processing executed by the master device 100 will be described with reference to FIG. 15. FIG. 15 is a flowchart illustrating an example of update processing according to the embodiment of the present disclosure. The update processing illustrated in FIG. 15 is executed, for example, when arbitrary communication is performed by the master device 100.

As illustrated in FIG. 15, the master device 100 first establishes an arbitrary communication path (Step S101). This communication path includes a communication path established for communication at the time of non-tethering in addition to a communication path established when used for tethering.

The master device 100 acquires communication path information regarding the established communication path (Step S102). The master device 100 calculates or estimates an arbitrary communication quality from the acquired communication path information (Step S103).

The master device 100 updates the dependence information using the calculated or estimated arbitrary communication quality (Step S104). Alternatively, the master device 100 may create new dependence information using arbitrary communication quality.

Note that, here, the update processing is executed in a case where the master device 100 performs communication using an arbitrary communication path, but it is not limited thereto. For example, the master device 100 may execute the update processing at an arbitrary timing such as a predetermined cycle. In this case, the master device 100 may calculate the communication quality of the communication path being used at the timing of executing the update processing. Alternatively, the master device 100 may select a communication path to be subjected to the update processing and establish the communication path selected in Step S101, thereby calculating the communication quality of the selected communication path.

3.2. Presentation Processing

Figure 16:
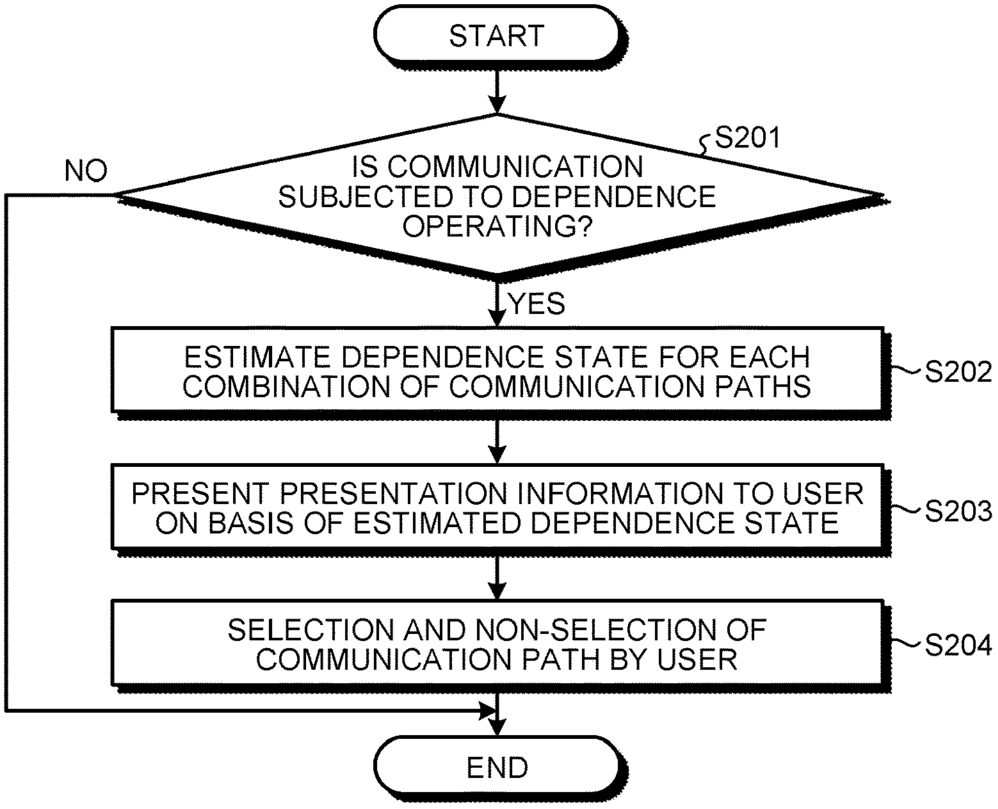
FIG. 16 is a flowchart illustrating an example of presentation processing according to an embodiment of the present disclosure.

Subsequently, presentation information presentation processing executed by the master device 100 will be described with reference to FIG. 16. FIG. 16 is a flowchart illustrating an example of presentation processing according to the embodiment of the present disclosure. The presentation processing illustrated in FIG. 16 is executed, for example, at the start of tethering.

As illustrated in FIG. 16, the master device 100 determines whether communication of the upper NW on which the lower NW is dependent is operating by tethering (Step S201). When it is determined that the operation is not performed (Step S201; No), the processing ends.

On the other hand, in a case where it is determined that communication subjected to dependence is operating (Step S201; Yes), the master device 100 estimates the communication path dependence state for each combination of the upper communication path and the lower communication path (Step S202).

The master device 100 presents the presentation information to the user on the basis of the estimated dependence state (Step S203). Subsequently, the master device 100 receives selection/non-selection of the communication path by the user (Step S204).

As described above, the master device 100 according to the embodiment of the present disclosure detects the upper communication path and the lower communication path having a dependence relationship. When detecting the upper communication path and the lower communication path having a dependence relationship, the master device 100 estimates the dependence state of combination for each combination of the plurality of upper communication paths and lower communication paths. As a result, the master device 100 can present information for suppressing deterioration of communication quality to the user.

4. MODIFICATIONS

4.1. First Modification

In the embodiment described above, the master device 100 estimates the dependence state according to the dependence relationship between the upper communication path and the lower communication path, but it is not limited thereto. For example, the master device 100 may estimate the deterioration of the communication quality on the basis of information other than the communication path. Specifically, for example, the master device 100 may estimate the deterioration of the communication quality on the basis of the position of the master device 100 such as home or office, or the setting of the master device 100 such as whether power saving setting is on. Such a point will be described as a first modification.

Figure 17:
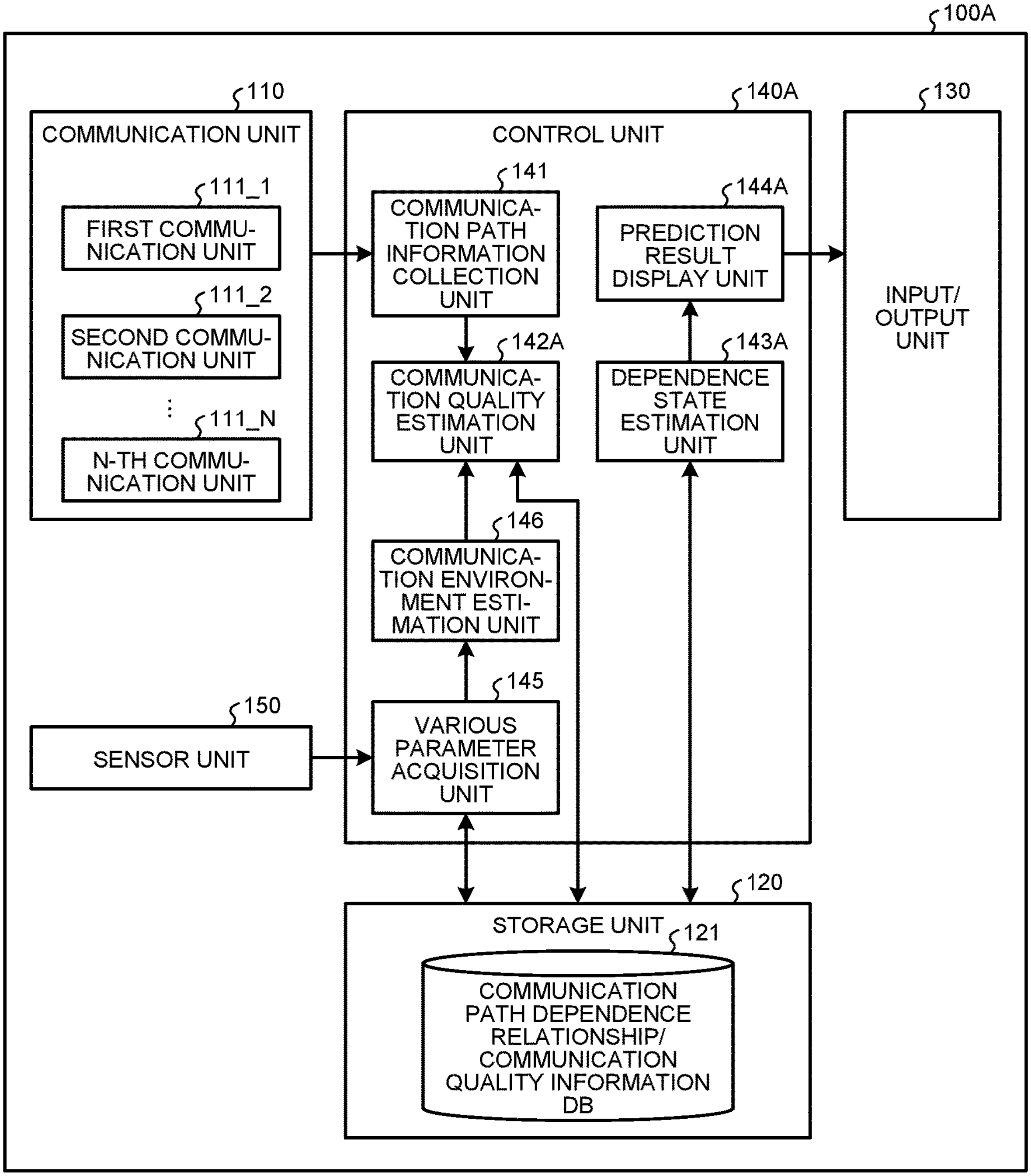
FIG. 17 is a block diagram illustrating a configuration example of a master device according to a first modification of the embodiment of the present disclosure.

FIG. 17 is a block diagram illustrating a configuration example of a master device 100A according to the first modification of the embodiment of the present disclosure. The master device 100A illustrated in FIG. 17 has the same configuration as the master device 100 illustrated in FIG. 5 except that the master device 100A includes a control unit 140A and a sensor unit 150. Further, the control unit 140A is different from the configuration of the master device 100 illustrated in FIG. 5 in that the control unit 140A includes a communication quality estimation unit 142A, a dependence state estimation unit 143A, a prediction result display unit 144A, various parameter acquisition unit 145, and a communication environment estimation unit 146.

The sensor unit 150 includes, for example, a sensor that detects a position and a pose of the master device 100, such as a global positioning system (GPS) sensor and an acceleration sensor. Note that the sensor unit 150 is not limited to the above, and may include various sensors.

The various parameter acquisition unit 145 acquires, for example, setting information of the master device 100A stored in the storage unit 120 and a sensing result by the sensor unit 150 as parameters. The various parameter acquisition unit 145 notifies the communication environment estimation unit 146 of the acquired parameters.

The communication environment estimation unit 146 estimates the communication environment of the master device 100A using the parameters acquired from the various parameter acquisition unit 145. The communication environment estimation unit 146 estimates, for example, whether or not the power saving setting is set, whether or not the master device 100A performs virtual private network (VPN) connection, and the like, and generates communication environment information. Further, the communication environment estimation unit 146 estimates a current position (for example, home/office, or the like) of the master device 100A on the basis of, for example, position information of the master device 100A, and generates communication environment information. Note that the communication environment estimation unit 146 may perform not only the above but may also perform various types of estimation such as, for example, whether or not the master device 100A is moving.

The communication environment estimation unit 146 outputs the estimated communication environment information to the communication quality estimation unit 142A.

The communication quality estimation unit 142A estimates the communication quality according to the acquired communication environment information. For example, the communication quality estimation unit 142A estimates whether or not the communication quality deteriorates according to whether or not the power saving setting is set, and stores the estimation result as the dependence information in the communication path dependence relationship/communication quality information database 121 of the storage unit 120.

FIG. 18 is a table for describing an example of dependence information according to the first modification of the embodiment of the present disclosure. FIG. 18 illustrates a case where the communication quality estimation unit 142A estimates whether or not the communication quality deteriorates according to whether or not the power saving setting is set.

In the example illustrated in FIG. 18, the communication quality estimation unit 142A estimates that the throughput changes according to whether power consumption setting is "OFF" or "ON" without depending on the upper communication path ("Any"). For example, when the power consumption setting is "OFF", the communication quality estimation unit 142A estimates that the degree of throughput deterioration is "0%", whereas when the power consumption setting is "ON", the degree of throughput deterioration is "−5%". Note that the power consumption setting is set to "OFF" by Default particularly in a case where setting or the like by the user is not performed.

Further, the communication quality estimation unit 142A estimates whether or not the communication quality deteriorates according to whether or not the VPN connection is performed, and stores the estimation result as the dependence information in the communication path dependence relationship/communication quality information database 121 of the storage unit 120.

FIG. 19 is a table for describing another example of dependence information according to the first modification of the embodiment of the present disclosure. FIG. 19 illustrates a case where the communication quality estimation unit 142A estimates whether or not the communication quality deteriorates according to whether or not the VPN connection is performed.

In the example illustrated in FIG. 18, the communication quality estimation unit 142A estimates that the throughput changes according to whether the VPN connection is "Absent" or "Present" without depending on the upper communication path ("Any"). For example, when the VPN connection is "Absent", the communication quality estimation unit 142A estimates that the degree of throughput deterioration is "0%", whereas when the VPN connection is "Present", the degree of throughput deterioration is "−10%". Note that the VPN connection is set to "Absent" by Default particularly in a case where setting or the like by the user is not performed.

Further, the communication quality estimation unit 142A estimates whether or not the communication quality deteriorates according to the location (position) of the master device 100A, and stores the estimation result as the dependence information in the communication path dependence relationship/communication quality information database 121 of the storage unit 120.

FIGS. 20 and 21 are tables for describing another example of dependence information according to the first modification of the embodiment of the present disclosure. FIG. 20 illustrates a case where the communication quality estimation unit 142A estimates the deterioration of the communication quality by associating the location with the lower communication path in a case where the upper communication path is Wi-Fi (registered trademark). FIG. 21 illustrates a case where the communication quality estimation unit 142A estimates the deterioration of the communication quality by associating the location with the lower communication path in a case where the upper communication path is cellular.

Here, in a case where the upper communication path is Wi-Fi (registered trademark), it is assumed that the communication quality of Wi-Fi (registered trademark) deteriorates in office more than at home due to, for example, interference. In this case, as illustrated in FIG. 20, in a case where the lower communication path is wired, the communication quality estimation unit 142A estimates that the deterioration degree of throughput is "0%" both at home and in office. Further, in a case where the lower communication path is Wi-Fi (registered trademark), the communication quality estimation unit 142A estimates that, for example, the deterioration degree of throughput at home is "−10%" and the deterioration degree in office is "−30%".

Further, in a case where the upper communication path is cellular, the millimeter wave is shielded by a wired adapter at home, but the shielding by the wired adapter does not occur in office. In this case, as illustrated in FIG. 21, in a case where the lower communication path is wired, the communication quality estimation unit 142A estimates that, for example, the deterioration degree of throughput at home is "−10%" and the deterioration degree in office is "0%". Further, in a case where the lower communication path is Wi-Fi (registered trademark), the communication quality estimation unit 142A estimates, for example, that the deterioration degree of throughput at home is "0%" and the deterioration degree in office is "−20%".

When estimating the dependence state of the combination of the communication paths, the dependence state estimation unit 143A also estimates, for example, the communication state of the combination of the environment and the communication path. For example, when detecting that the upper communication path used for tethering is cellular using the millimeter wave, the dependence state estimation unit 143A estimates the deterioration of the communication quality by combining the location of the master device 100A and the upper communication path.

The prediction result display unit 144A can present the presentation information including environment information to the user on the basis of the estimation result of the dependence state estimation unit 143A. In a case where it is estimated that the communication quality is improved by setting the power saving setting to "OFF", the prediction result display unit 144A presents, for example, text recommending setting the power saving setting to "OFF" to the user as the presentation information.

As described above, the master device 100A estimates the communication state in consideration of the environmental information other than the communication, and presents the presentation information to the user, whereby the user can select the setting and the environmental condition of the master device 100A according to the communication state.

Figure 22:
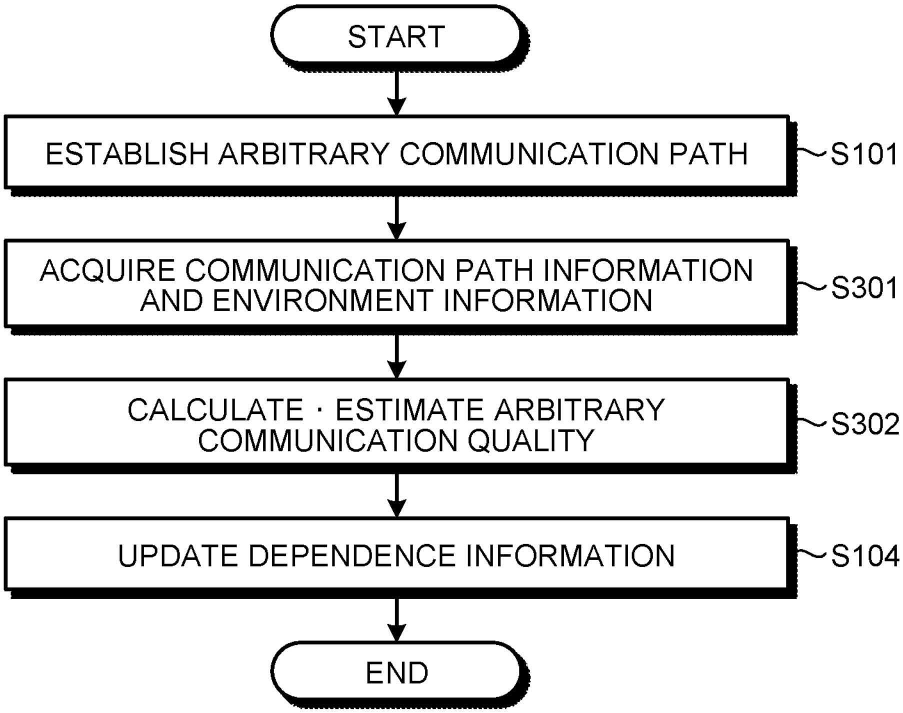
FIG. 22 is a flowchart illustrating an example of update processing according to the first modification of the embodiment of the present disclosure.

Subsequently, dependence information update processing executed by the master device 100A will be described with reference to FIG. 22. FIG. 22 is a flowchart illustrating an example of update processing according to the first modification of the embodiment of the present disclosure. In the update processing illustrated in FIG. 22, the same processing as the update processing illustrated in FIG. 15 is denoted by the same reference sign, and description thereof is omitted.

As illustrated in FIG. 22, when the communication path is established in Step S101, the master device 100A acquires the environment information in addition to the communication path information (Step S301). Further, the master device 100A calculates or estimates an arbitrary communication quality according to the environment information (Step S302).

As described above, the master device 100A according to the first modification of the embodiment of the present disclosure estimates the communication quality according to the environmental information, and generates the dependence information. As a result, it is possible to present information for suppressing deterioration of communication quality according to the environment of the master device 100A to the user.

4.2. Second Modification

In addition to the configurations of the above-described embodiment and first modification, the capability information may be received from a slave device 200B. Such a point will be described as a second modification.

Figure 23:
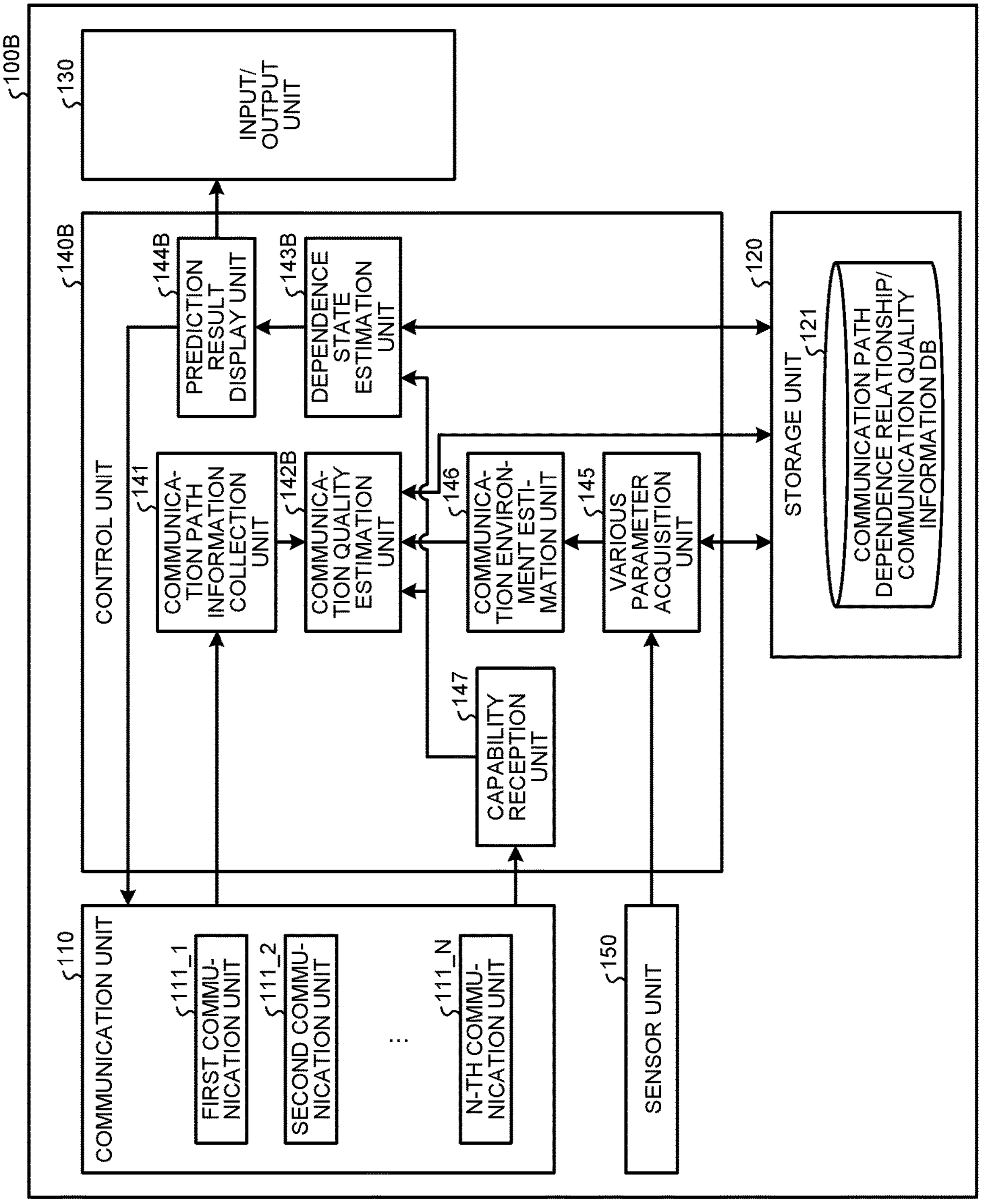
FIG. 23 is a block diagram illustrating a configuration example of a master device according to a second modification of the embodiment of the present disclosure.

FIG. 23 is a block diagram illustrating a configuration example of a master device 100B according to the second modification of the embodiment of the present disclosure. The master device 100B illustrated in FIG. 23 is different from the configuration of the master device 100A illustrated in FIG. 17 in that a control unit 140B includes a communication quality estimation unit 142B, a dependence state estimation unit 143B, a prediction result display unit 144B, and a capability reception unit 147.

The capability reception unit 147 receives the capability information from the slave device 200B. The capability information includes, for example, information regarding the upper communication path or the lower communication path that the slave device 200B desires to select and information regarding the communication quality of tethering that the slave device 200B desires, such as an index of the communication quality, a threshold value for the index, and the like.

The capability reception unit 147 notifies the communication quality estimation unit 142B and the dependence state estimation unit 143B of the received capability information.

The communication quality estimation unit 142B estimates the communication quality on the basis of the capability information and updates the dependence information. For example, the communication quality estimation unit 142B estimates the communication quality with the index included in the capability information.

More specifically, in a case where the dependence information regarding the index included in the capability information is stored in the storage unit 120, the communication quality estimation unit 142B updates the dependence information. Further, in a case where the dependence information regarding the index included in the capability information is not stored in the storage unit 120, the communication quality estimation unit 142B calculates the communication quality of the communication path with the index and newly generates the dependence information.

The dependence state estimation unit 143B estimates the dependence state of the communication path satisfying the condition included in the capability information. For example, the dependence state estimation unit 143B acquires the deterioration degree of the communication quality from the communication environment satisfying the condition included in the capability information, and estimates the combination of the communication paths having a small deterioration degree. For example, in a case where the capability information includes information regarding the upper communication path or the lower communication path that the slave device 200B desires to select, the dependence state estimation unit 143B acquires the communication quality of the combination of the communication paths that the slave device 200B desires, and determines the combination of the communication paths having the smallest deterioration degree of the communication quality.

The dependence state estimation unit 143B notifies the prediction result display unit 144B of the estimation result. For example, the prediction result display unit 144B receives a combination of the communication paths having the smallest deterioration degree of the communication quality as an estimation result, and presents information regarding the received combination of communication paths to the user as presentation information. Further, the prediction result display unit 144B notifies the slave device 200B of the presentation information via the communication unit 110.

Figure 24:
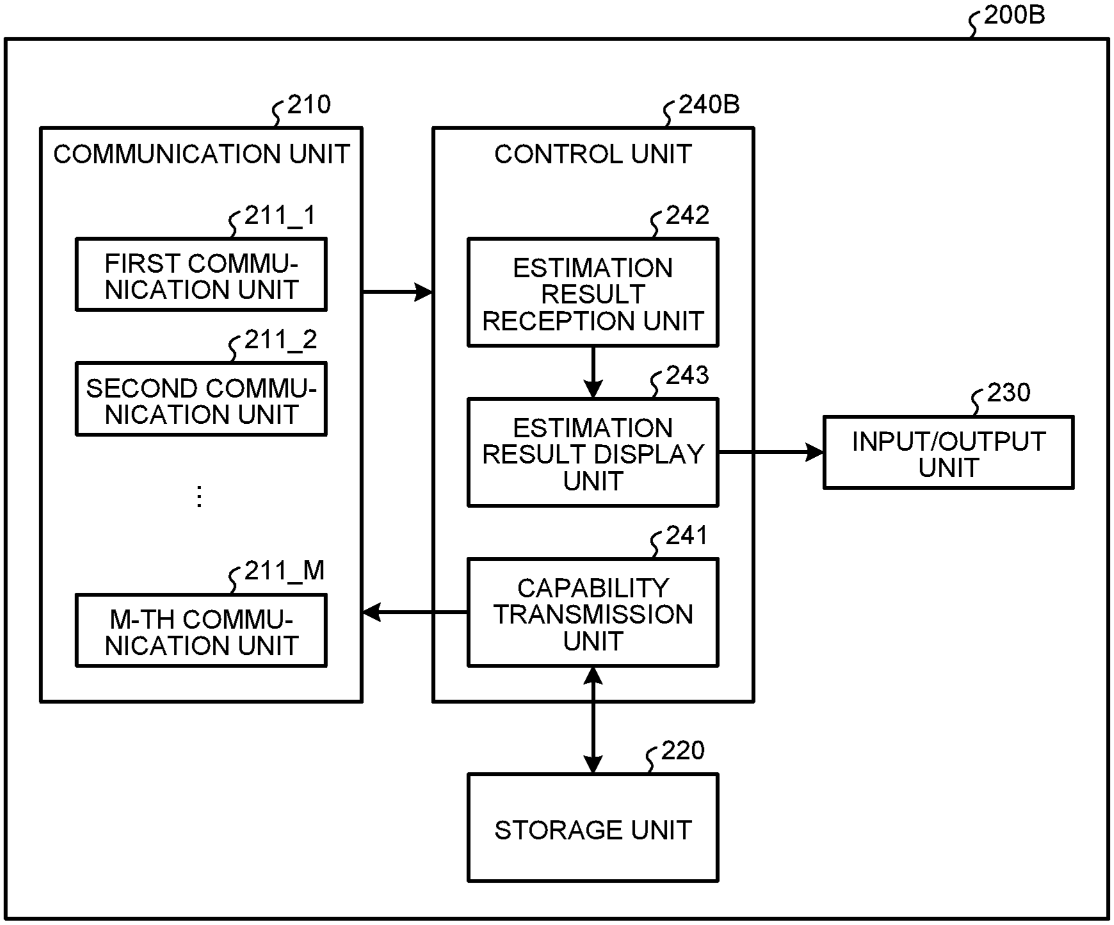
FIG. 24 is a block diagram illustrating a configuration example of a slave device according to the second modification of the embodiment of the present disclosure.

FIG. 24 is a block diagram illustrating a configuration example of the slave device 200B according to the second modification of the embodiment of the present disclosure. The slave device 200B illustrated in FIG. 24 is different from the configuration of the slave device 200 illustrated in FIG. 14 in that a control unit 240B includes a capability transmission unit 251, an estimation result reception unit 252, and an estimation result display unit 253.

The capability transmission unit 251 generates the capability information described above and transmits the capability information to the master device 200B via the communication unit 210.

The estimation result reception unit 252 receives the presentation information as the estimation result from the master device 200B via the communication unit 210.

The estimation result display unit 253 presents the received presentation information to the user via the input/output unit 230.

Here, the capability information transmitted by the slave device 200B can include, for example, information regarding a communication standard (for example, Ethernet (registered trademark), USB, Bluetooth (registered trademark), or Wi-Fi (registered trademark)) that the slave device 200B supports.

Further, the capability information may include protocol information such as 100/1000/10GBASE-T or 802.11 ax/ac.

The capability information may include a threshold value corresponding to the index of the communication quality. Examples of the index include throughput, delay, jitter, and the like. Further, the threshold value can include a lower limit value or an upper limit value of the index, such as 50 Mbps or RTT 10 ms.

Alternatively, the capability information may include information designating an index regarding communication quality for a domain or an IP address of a specific server or communication quality specifying a communication direction such as Uplink/Downlink. Alternatively, the capability information may include information that can be calculated on the basis of the communication quality. Further, the index can include, for example, information regarding an FTP Upload time of data of a predetermined size (for example, 1 GB) and an estimated resolution at the time of performing movie Live Upload.

Note that any form can be adopted as a format of data exchanged between the master device 100B and the slave device 200B, such as the capability information. Examples of the format include XML, JSON, protobuf, and YAML.

Figure 25:
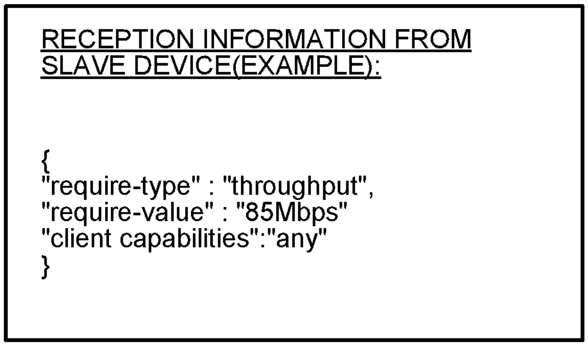
FIG. 25 is a diagram illustrating an example of capability information according to the second modification of the embodiment of the present disclosure.

Here, an example of the capability information according to the second modification of the embodiment of the present disclosure will be described with reference to FIG. 25. FIG. 25 is a diagram illustrating an example of the capability information according to the second modification of the embodiment of the present disclosure.

As illustrated in FIG. 25, the capability information transmitted by the slave device 200B includes, for example, the index "require-type" of communication quality that the slave device 200 desires, the threshold value "require-value" of the index, and the type "client capabilities" of a desired lower communication path.

In the example of FIG. 25, the index "require-type" of the communication quality is "throughput", and the threshold value "require-value" is "85 Mbps". This indicates that the slave device 200B desires communication with a "throughput" of "85 Mbps" or more as the communication quality at the time of tethering.

In other words, the type "client capabilities" of the desired lower communication path is information indicating a communication standard that the slave device 200B supports. In the example of FIG. 25, "client capabilities" is "Any" indicating that the slave device 200B supports all communication standards that the master device 100B supports as the lower communication path.

The communication quality estimation unit 142B of the master device 100B that has received the capability information illustrated in FIG. 25 estimates the throughput as the communication quality and updates the dependence information.

FIG. 26 is a table illustrating an example of dependence information according to the second modification of the embodiment of the present disclosure. For example, the communication quality estimation unit 142B generates or updates the dependence information illustrated in FIG. 26 using the received capability information.

FIG. 26 illustrates the estimated throughput of the slave device 200 in a combination of WLAN and cellular as the upper communication path and Eth (Ethernet (registered trademark)), USB, BT (Bluetooth (registered trademark)), and WLAN as the lower communication path.

Here, when estimating the dependence state between the lower communication path and the upper communication path, the dependence state estimation unit 143B estimates the dependence state for a combination of communication paths satisfying a condition ("throughput" is "85 Mbps" or more) included in the capability information illustrated in FIG. 25.

For example, in the dependence information illustrated in FIG. 26, in a case where the upper communication path is WLAN, the lower communication path is Eth (Ethernet (registered trademark)), USB, and WLAN as the combination of communication paths satisfying the condition of the capability information. Further, in a case where the upper communication path is cellular, the combination of the lower communication path being WLAN satisfies the condition of the capability information. Note that, in FIG. 26, a combination satisfying the condition of the capability information is hatched.

For example, the dependence state estimation unit 143B estimates a combination that can further improve the communication quality from a combination that satisfies the condition, and notifies the prediction result display unit 144B of the estimation result.

As a result, the prediction result display unit 144B can present information regarding the communication quality of the communication path satisfying the request of the slave device 200B, the communication quality being communication quality of tethering, to the user via the master device 100B and the slave device 200B.

FIG. 27 is a diagram illustrating another example of capability information according to the second modification of the embodiment of the present disclosure.

In the example of FIG. 27, the index "require-type" of the communication quality is "latency", and the threshold value "require-value" is not designated (null). Further, "client capabilities" is Ethernet (registered trademark) and Wi-Fi (registered trademark).

The communication quality estimation unit 142B of the master device 100B that has received the capability information illustrated in FIG. 27 estimates the delay as the communication quality and updates the dependence information.

FIG. 28 is a table illustrating another example of dependence information according to the second modification of the embodiment of the present disclosure. For example, the communication quality estimation unit 142B generates or updates the dependence information illustrated in FIG. 28 using the received capability information.

In FIG. 28, the upper communication path is not particularly designated (Any), and the delay deterioration degree in a case where the lower communication path is Eth (Ethernet (registered trademark)), USB, and WLAN as compared with the time of non-tethering is illustrated.

Here, when estimating the dependence state between the lower communication path and the upper communication path, the dependence state estimation unit 143B estimates the dependence state for a combination of communication paths satisfying a condition (the lower communication path is Ethernet (registered trademark) or Wi-Fi (registered trademark)) included in the capability information illustrated in FIG. 27.

For example, in the dependence information illustrated in FIG. 28, the lower communication path satisfying the condition of the capability information is a case where the lower communication path is Eth (Ethernet (registered trademark)) and WLAN. Note that, in FIG. 26, the lower communication path satisfying the condition of the capability information is hatched.

For example, the dependence state estimation unit 143B estimates a communication path that can further improve the communication quality from a communication path that satisfies the condition, and notifies the prediction result display unit 144B of the estimation result.

As a result, the prediction result display unit 144B can present information regarding the communication path of the communication quality satisfying the request of the slave device 200B to the user via the master device 100B and the slave device 200B.

Note that, for example, the slave device 200B may include information regarding an application used at the time of tethering in the capability information. In this case, the master device 100B updates or generates the dependence information on the basis of the application information and the index included in the capability information.

FIG. 29 is a table illustrating another example of dependence information according to the second modification of the embodiment of the present disclosure. For example, the communication quality estimation unit 142B generates or updates the dependence information illustrated in FIG. 29 using the received capability information.

For example, it is assumed that the capability information includes information of an application that performs Live streaming of a movie and information that designates an estimated resolution at the time of streaming as an index.

In this case, the quality estimation unit 142B estimates the resolution at which the streaming of a movie is possible in the combination of the upper communication path and the lower communication path. For example, in Live streaming of a movie, the quality estimation unit 142B estimates a resolution at which streaming is possible when performing streaming at 60 fps with the video codec H.264 for each combination of communication paths.

Here, when estimating the dependence state between the lower communication path and the upper communication path, the dependence state estimation unit 143B estimates the dependence state for a combination of communication paths satisfying a condition (for example, minimum resolution) included in the capability information. Note that the dependence state estimation unit 143B may detect a combination of communication paths satisfying a plurality of conditions (for example, a condition regarding delay and a condition regarding resolution). In FIG. 29, as described above, a combination of communication paths satisfying a plurality of conditions is hatched.

Figure 30:
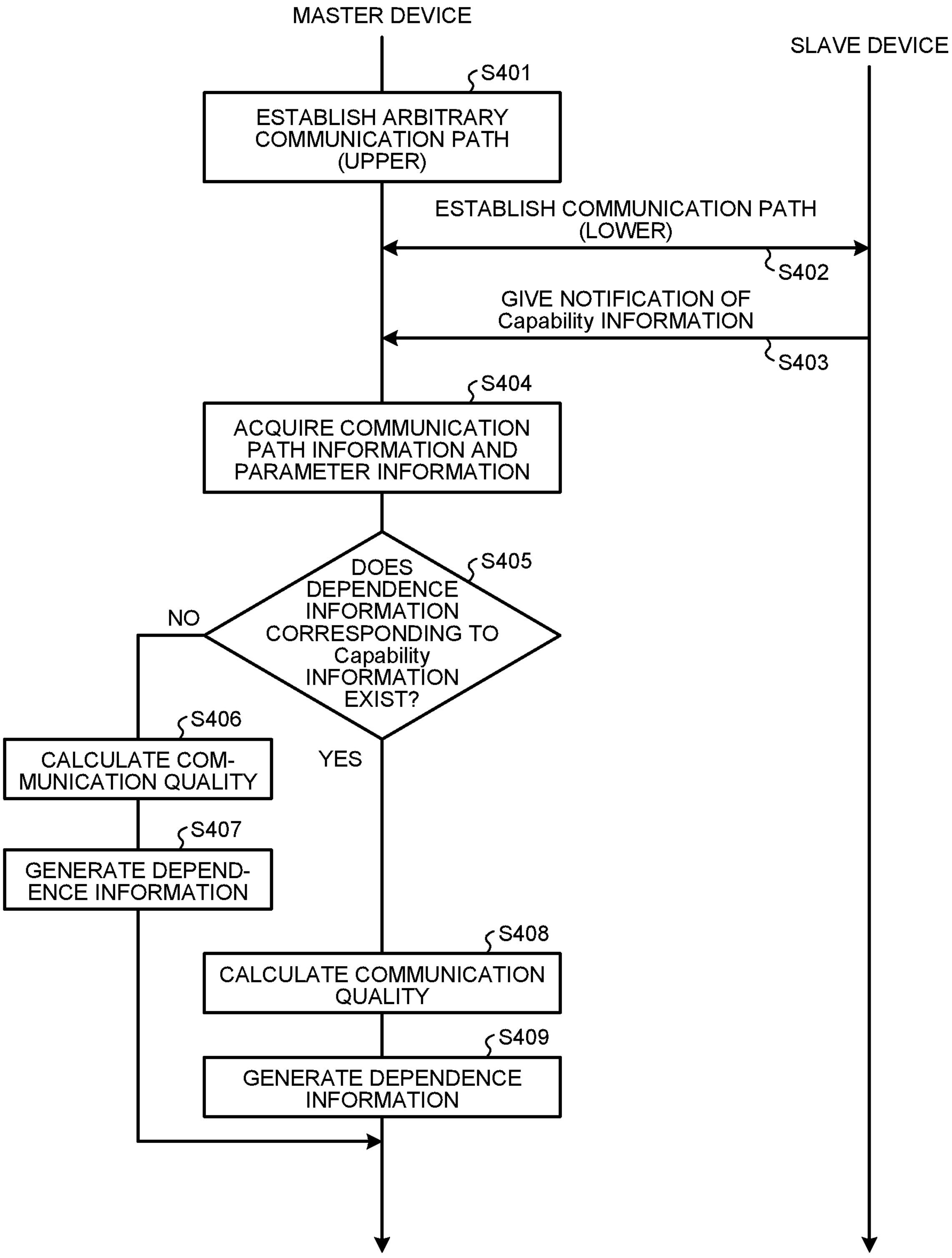
FIG. 30 is a sequence diagram illustrating an example of update processing according to the second modification of the embodiment of the present disclosure.

Subsequently, dependence information update processing using capability information will be described with reference to FIG. 30. FIG. 30 is a sequence diagram illustrating an example of update processing according to the second modification of the embodiment of the present disclosure.

First, the master device 100B establishes an arbitrary upper communication path (Step S401). Next, the master device 100B establishes a lower communication path with the slave device 200B (Step S402).

The slave device 200B gives a notification of the capability information using the established lower communication path (Step S402).

The master device 100B acquires communication path information and parameter information (Step S404).

The master device 100B that has received the capability information determines whether the dependence information corresponding to the capability information exists (Step S405).

When the corresponding dependence information does not exist (Step S405; No), the master device 100B calculates an index included in the capability information as the communication quality (Step S406), and generates the dependence information corresponding to the capability information (Step S407).

On the other hand, when the corresponding dependence information exists (Step S405; Yes), the master device 100B calculates the communication quality of the corresponding dependence information (Step S408), and updates the dependence information corresponding to the capability information (Step S409).

Figure 31:
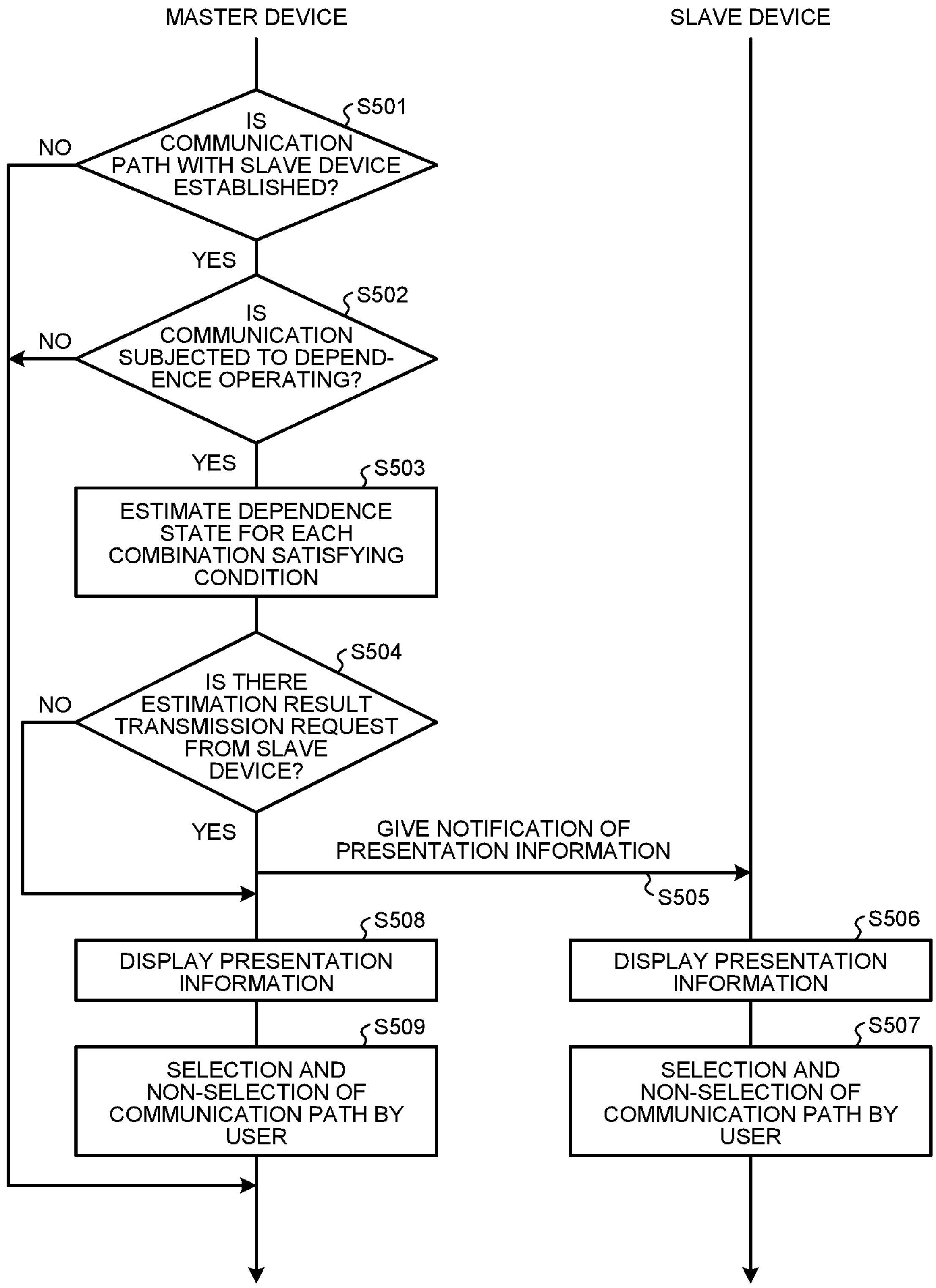
FIG. 31 is a sequence diagram illustrating an example of presentation processing according to the second modification of the embodiment of the present disclosure.

Next, presentation information presentation processing by the communication system 1 will be described with reference to FIG. 31. FIG. 31 is a sequence diagram illustrating an example of presentation processing according to the second modification of the embodiment of the present disclosure.

As illustrated in FIG. 31, the master device 100B determines whether or not a communication path is established with the slave device 200B (Step S501). Note that the communication path determined here is a lower communication path.

When the communication path is not established with the slave device 200B (Step S501; No), the processing ends. On the other hand, in a case where a communication path has been established with the slave device 200B (Step S501; Yes), the master device 100B determines whether or not communication on which the communication path is dependent is operating (Step S502). Note that the communication here is communication using an upper communication path.

When communication subjected to dependence is not operating (Step S502; No), the processing ends. On the other hand, in a case where communication subjected to dependence is operating (Step S502; Yes), the master device 100B adds the information (capability information) from the slave device 200B to the communication quality to be estimated and the environmental conditions (Step S503).

The master device 100B estimates the dependence state for each combination satisfying the condition included in the capability information (Step S503).

The master device 100B determines whether or not there is an estimation result transmission request from the slave device 200B (Step S504). When there is no transmission request (Step S504; No), the processing proceeds to Step S509.

When there is a transmission request (Step S504; Yes), the master device 100B notifies the slave device 200B of the presentation information (Step S505).

The slave device 200B that has received the presentation information displays the received presentation information on the input/output unit 230 (Step S506), and receives selection/non-selection of the communication path by the user (Step S507).

The master device 100B that has transmitted the presentation information to the slave device 200B in Step S506 displays the presentation information on the input/output unit 130 of the own apparatus (Step S508), and receives selection/non-selection of the communication path by the user (Step S509).

As described above, in the present modification, the master device 100B estimates the dependence state of the combination of the communication paths on the basis of the capability information received from the slave device 200B. As a result, the master device 2100B can prompt the user to select a communication path that satisfies the capability and the request of the slave device 200B.

Further, in the present modification, the master device 100B transmits the presentation information to the slave device 200B. As a result, the user can also select the communication path from the slave device 200B side.

4.3. Third Modification

In the above-described embodiment and modifications, the master devices 100, 100A, and 100B present the presentation information to the user, but it is not limited thereto. For example, the lower communication path may be automatically switched according to the dependence state estimated by the master device 100B. Such a point will be described as a third modification.

Figure 32:
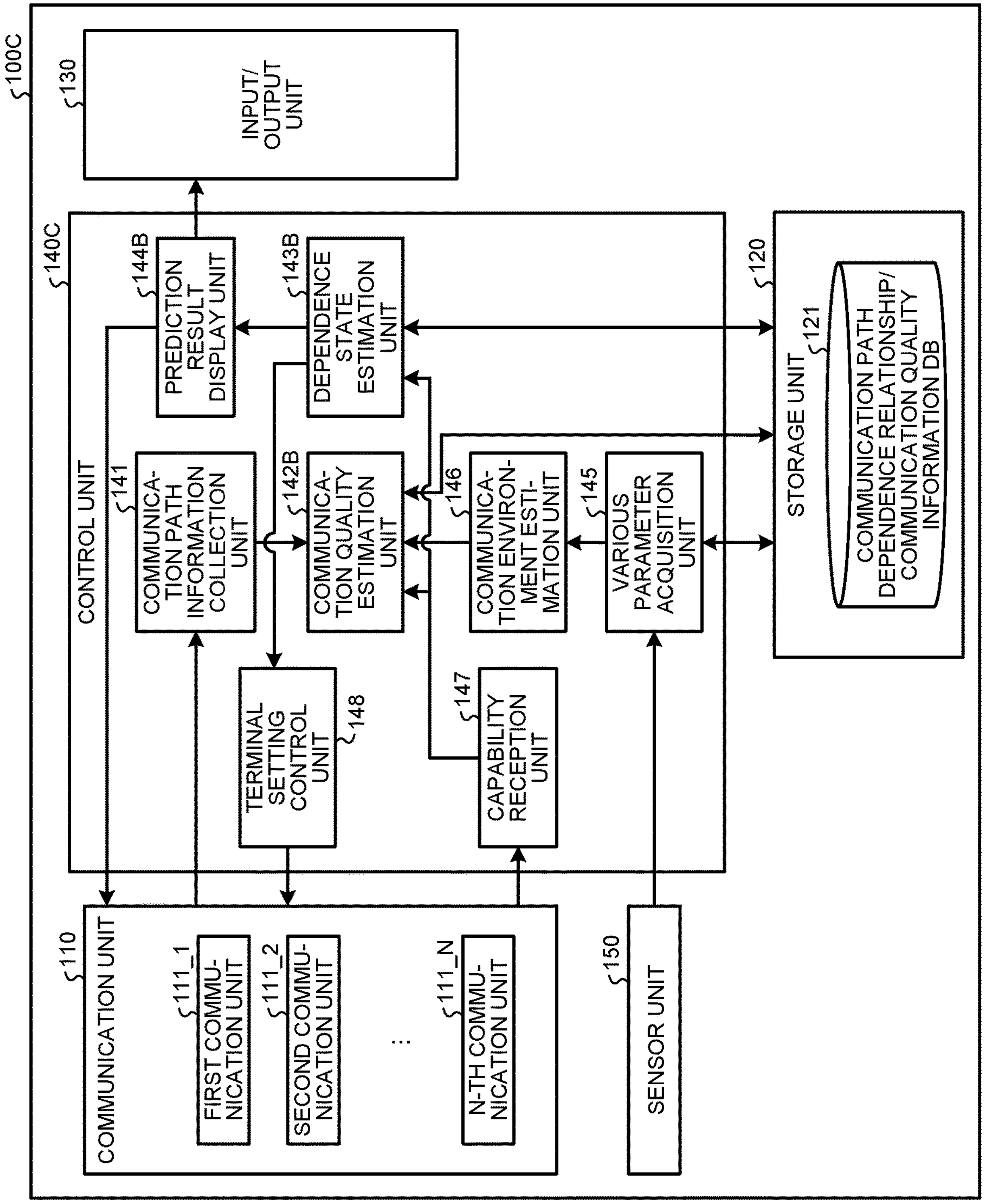
FIG. 32 is a block diagram illustrating a configuration example of a master device according to a third modification of the embodiment of the present disclosure.

FIG. 32 is a block diagram illustrating a configuration example of a master device 100C according to the third modification of the embodiment of the present disclosure. The master device 100C illustrated in FIG. 32 has the same configuration as the master device 100B illustrated in FIG. 23 except that a control unit 140C includes a terminal setting control unit 148.

The terminal setting control unit 148 makes a change to a communication environment in which the communication quality is further improved on the basis of the estimation result of the dependence state by the dependence state estimation unit 143B. For example, the terminal setting control unit 148 selects a lower communication path that satisfies the capability information from the slave device 200B and has the best communication quality, and makes a change to the selected lower communication path. Alternatively, the terminal setting control unit 148 may change the terminal settings such as the upper communication path and the power saving setting. The terminal setting can include, in addition to the power saving setting, suppression of the operation of the master device 100C, such as restriction of a predetermined application function and restriction of communication other than tethering.

Note that the change by the terminal setting control unit 148 may include a change not intended by the user. Thus, the master device 100C may acquire permission from the user in advance. In this case, the master device 100C may acquire permission by presenting a change that can be made, such as stop of a specific application, to the user.

Figure 33:
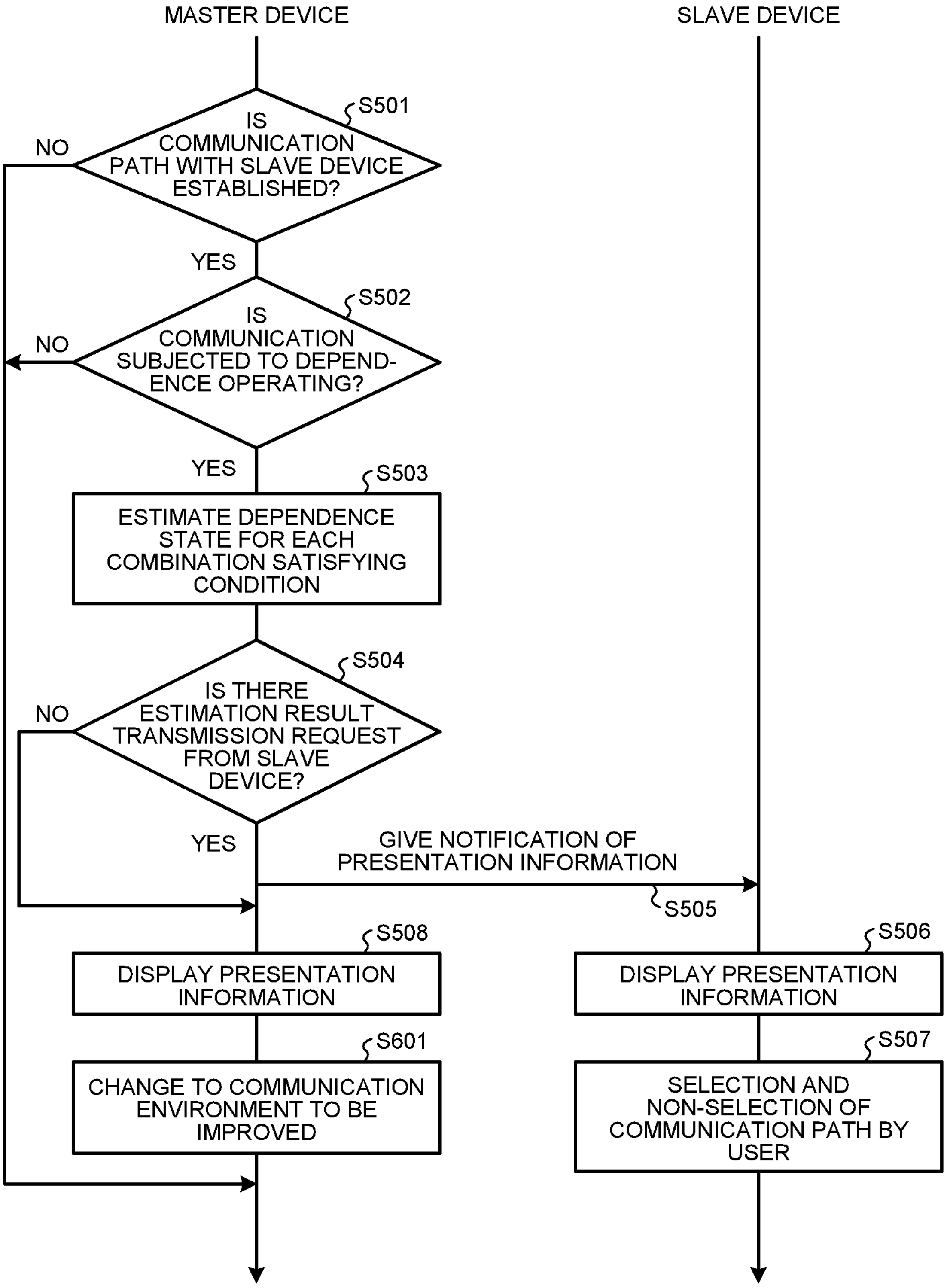
FIG. 33 is a sequence diagram illustrating an example of presentation processing according to the third modification of the embodiment of the present disclosure.

Next, presentation information presentation processing by the communication system 1 will be described with reference to FIG. 33. FIG. 33 is a sequence diagram illustrating an example of presentation processing according to the third modification of the embodiment of the present disclosure. Note that the same processing as that in FIG. 31 is denoted by the same reference sign, and description thereof is omitted.

The master device 100C that has estimated the dependence state in Step S503 makes a change to the communication environment to be improved on the basis of the estimated dependence state (Step S601).

As described above, in the present modification, the master device 100C automatically changes the communication environment. As a result, it is possible to improve a tethering communication environment without bothering the user.

Note that, although the case where the present modification is applied to the master device 100B has been described here, the present modification can be similarly applied to the master devices 100 and 100A.

Further, here, the communication environment of the master device 100C is automatically changed, but it is not limited thereto. For example, the slave device 200B may change the communication environment such that the slave device 200B automatically changes the lower communication path according to a change of the lower communication path of the master device 100C.

5. CONCLUSION

Although the embodiments of the present disclosure have been described above, the technical scope of the present disclosure is not limited to the above-described embodiments as it is, and various changes can be made without departing from the gist of the present disclosure. Further, components of different embodiments and modifications may be appropriately combined.

A control apparatus that controls the communication apparatuses 100 and 100A to 100C and the terminal apparatuses 200 and 200B of the present embodiment may be achieved by a dedicated computer system or may be achieved by a general-purpose computer system.

For example, a communication program for executing the above-described operation is stored and distributed in a computer-readable recording medium such as an optical disk, a semiconductor memory, a magnetic tape, or a flexible disk. Then, for example, the program is installed in a computer, and the above-described processing is executed to configure the control apparatus. At this time, the control apparatus may be an apparatus (for example, a personal computer) outside the communication apparatuses 100 and 100A to 100C and the terminal apparatuses 200 and 200B. Further, the control apparatus may be an apparatus (for example, the control units 140 and 140A to 140C, and the control units 240 and 240B) inside the communication apparatuses 100 and 100A to 100C and the terminal apparatuses 200 and 200B.

Further, the communication program may be stored in a disk apparatus included in a server apparatus on a network such as the Internet so that the communication program can be downloaded to a computer. Further, the above-described functions may be achieved by cooperation of an operating system (OS) and application software. In this case, a portion other than the OS may be stored in a medium and distributed, or a portion other than the OS may be stored in the server apparatus and downloaded to a computer.

Further, among the pieces of processing described in the above embodiment, all or some of the pieces of processing described as being performed automatically can be performed manually, or all or some of the pieces of processing described as being performed manually can be performed automatically by a known method. In addition, the processing procedures, the specific names, and the information including various data and parameters indicated in the document and the drawings can be arbitrarily changed unless otherwise specified. For example, the various information illustrated in each drawing are not limited to the illustrated information.

Further, each component of each apparatus illustrated in the drawings is functionally conceptual, and is not necessarily physically configured as illustrated in the drawings. That is, a specific form of distribution and integration of apparatuses is not limited to those illustrated, and all or a part thereof can be functionally or physically distributed and integrated in an arbitrary unit according to various loads, usage situations, and the like. Note that this configuration by distribution and integration may be performed dynamically.

Further, the above-described embodiment can be appropriately combined within an area not contradicting processing contents. Further, the order of each step illustrated in the flowchart of the above-described embodiment can be changed as appropriate.

Further, for example, the present embodiment can be implemented as any configuration constituting an apparatus or a system, for example, a processor as a system large scale integration (LSI) or the like, a module using a plurality of processors or the like, a unit using a plurality of modules or the like, a set obtained by further adding other functions to a unit, or the like (that is, a configuration of a part of the apparatus).

Note that, in the present embodiment, the system means a set of a plurality of components (apparatuses, modules (parts), and the like), and it does not matter whether or not all the components are in the same housing. Accordingly, a plurality of apparatuses housed in separate housings and connected via a network and one apparatus in which a plurality of modules is housed in one housing are both the system.

Further, for example, the present embodiment can adopt a configuration of cloud computing in which one function is shared and processed by a plurality of apparatuses in cooperation via a network.

Note that the effects of the embodiments described in the present specification are merely examples and are not limitative, and there may be other effects.

Note that the present technology can also have the following configurations.

(1)

A communication apparatus comprising:

a first communication unit that performs wireless communication via an upper communication path;

a second communication unit that communicates with a terminal apparatus via a selected communication path that is one of a plurality of lower communication paths including a wireless communication path and a wired communication path; and a control unit that detects whether or not communication using the selected communication path has an effect on the upper communication path, and, when the effect is detected, estimates, for each combination of the plurality of lower communication paths and the upper communication path, a communication state of the upper communication path and the lower communication path included in the combination.

(2)

The communication apparatus according to (1), wherein the control unit causes a display unit to display information regarding an estimation result of the communication state.

(3)

The communication apparatus according to (1), wherein the control unit changes the selected communication path according to an estimation result of the communication state.

(4)

The communication apparatus according to any one of (1) to (3), wherein the control unit estimates the communication state according to at least one of an antenna module used by the first communication unit and information regarding communication of the first communication unit.

(5)

The communication apparatus according to any one of (1) to (4), wherein the control unit estimates the communication state according to at least one of an antenna module used by the second communication unit and information regarding communication of the second communication unit.

(6)

The communication apparatus according to any one of (1) to (5), wherein the control unit estimates the communication state according to an environment in which the communication apparatus is used.

(7)

The communication apparatus according to any one of (1) to (6) wherein the control unit, on a basis of effect information calculated in advance indicating whether or not the lower communication path has an effect on the upper communication path, detects whether or not there is the effect.

(8)

The communication apparatus according to (7), wherein the control unit updates the effect information on a basis of communication path information acquired from the first communication unit and the second communication unit.

(9)

The communication apparatus according to (7) or (8), wherein the control unit estimates the communication state on a basis of the effect information.

(10)

The communication apparatus according to any one of (1) to (9), wherein the control unit estimates the communication state on a basis of information acquired from the terminal apparatus.

(11)

The communication apparatus according to (10), wherein the control unit estimates the communication state of the upper communication path and the lower communication path included in the combination satisfying a condition included in the information acquired from the terminal apparatus.

(12)

The communication apparatus according to any one of (1) to (11), wherein the first communication unit performs wireless communication using millimeter waves.

(13)

A communication method comprising:

performing wireless communication via an upper communication path;

communicating with a terminal apparatus via a selected communication path that is one of a plurality of lower communication paths including a wireless communication path and a wired communication path; and detecting whether or not communication using the selected communication path has an effect on the upper communication path, and, when the effect is detected, estimating, for each combination of the plurality of lower communication paths and the upper communication path, a communication state of the upper communication path and the lower communication path included in the combination.

REFERENCE SIGNS LIST

1 COMMUNICATION SYSTEM

100, 100A, 100B, 100C COMMUNICATION APPARATUS (MASTER DEVICE)

110, 210 COMMUNICATION UNIT

120, 220 STORAGE UNIT

130, 230 INPUT/OUTPUT UNIT

140, 140A, 140B, 140C, 240, 240B CONTROL UNIT

200, 200B TERMINAL APPARATUS (SLAVE DEVICE)

The invention claimed is:

1. A communication apparatus, comprising:

a central processing unit (CPU) configured to:

control a first network interface to execute wireless communication via an upper communication path;

control a second network interface to communicate with a terminal apparatus via specific lower communication path, wherein the specific lower communication path is selected from of a plurality of lower communication paths, and the plurality of lower communication paths includes at least a wireless communication path and a wired communication path;

detect a dependence relationship between the upper communication and the specific lower communication path based on an effect on the upper communication path by the communication via the specific lower communication path; and estimate, based on the dependence relationship, for each combination of a plurality of combinations of the upper communication path and the plurality of lower communication paths, a communication state of the upper communication path and a corresponding lower communication path of the plurality of lower communication paths, wherein the plurality of combinations of the upper communication path and the plurality of lower communication paths includes:

a first combination of the upper communication path with a first lower communication path of the plurality of lower communication paths; and a second combination of the upper communication path with a second lower communication path of the plurality of lower communication paths.

2. The communication apparatus according to claim 1, wherein the CPU is further configured to control a display device to display information associated with the estimation of the communication state.

3. The communication apparatus according to claim 1, wherein the CPU is further configured to change the specific lower communication path based on the estimation of the communication state.

4. The communication apparatus according to claim 1, wherein the CPU is further configured to estimate the communication state based on at least one of:

an antenna module associated with the first network interface; and information associated with the wireless communication of the first network interface.

5. The communication apparatus according to claim 1, wherein the CPU is further configured to estimate the communication state based on at least one of:

an antenna module associated with the second network interface; and information associated with the communication of the second network interface.

6. The communication apparatus according to claim 1, wherein the CPU is further configured to estimate the communication state based on an environment of the communication apparatus.

7. The communication apparatus according to claim 1, wherein the CPU is further configured to detect the dependence relationship based on effect information, the effect information is calculated in advance to the detection of the dependence relationship, and the dependence relationship indicates the effect on the upper communication path by the communication via the specific lower communication path.

8. The communication apparatus according to claim 7, wherein the CPU is further configured to:

acquire communication path information from the first network interface and the second network interface; and update the effect information based on the communication path information.

9. The communication apparatus according to claim 7, wherein the CPU is further configured to estimate the communication state based on the effect information.

10. The communication apparatus according to claim 1, wherein the CPU is further configured to:

acquire information from the terminal apparatus; and estimate the communication state based on the acquired information.

11. The communication apparatus according to claim 10, wherein the acquired information includes a condition, and the CPU is further configured to estimate the communication state of the upper communication path and the corresponding lower communication path based on the condition.

12. The communication apparatus according to claim 1, wherein the first network interface is configured to execute the wireless communication based on millimeter waves.

13. A communication method, comprising:

controlling wireless communication via an upper communication path;

controlling communication with a terminal apparatus via a specific lower communication path, wherein the specific lower communication path is selected from a plurality of lower communication paths, and the plurality of lower communication paths includes at least a wireless communication path and a wired communication path;

detecting a dependence relationship between the upper communication and the specific lower communication path based on an effect on the upper communication path by the communication via the specific lower communication path; and estimating, based on the dependence relationship, for each combination of a plurality of combinations of the upper communication path and the plurality of lower communication paths, a communication state of the upper communication path and a corresponding lower communication path of the plurality of lower communication paths, wherein the plurality of combinations of the upper communication path and the plurality of lower communication paths includes:

a first combination of the upper communication path with a first lower communication path of the plurality of lower communication paths; and a second combination of the upper communication path with a second lower communication path of the plurality of lower communication paths.

* * * * *